United States Patent
Yerramalli et al.

(10) Patent No.: US 11,653,341 B2
(45) Date of Patent: *May 16, 2023

(54) FRAME-BASED INITIATOR DEVICE OPERATION

(71) Applicant: QUALCOMM Incorporated, San Diego, CA (US)

(72) Inventors: Srinivas Yerramalli, Hyderabad (IN); Jing Sun, San Diego, CA (US); Xiaoxia Zhang, San Diego, CA (US); Tamer Kadous, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/367,583

(22) Filed: Jul. 5, 2021

(65) Prior Publication Data

US 2021/0337540 A1    Oct. 28, 2021

Related U.S. Application Data

(63) Continuation of application No. 16/391,001, filed on Apr. 22, 2019, now Pat. No. 11,057,885.

(Continued)

(51) Int. Cl.
*H04W 72/04* (2023.01)
*H04W 72/0446* (2023.01)
*H04W 72/1268* (2023.01)
*H04W 74/08* (2009.01)

(52) U.S. Cl.
CPC ... *H04W 72/0446* (2013.01); *H04W 72/1268* (2013.01); *H04W 74/0808* (2013.01)

(58) Field of Classification Search
CPC ......... H04W 72/0446; H04W 72/1268; H04W 74/0808; H04W 74/006

(Continued)

(56) References Cited

U.S. PATENT DOCUMENTS 11,057,885 B2   7/2021  Yerramalli et al.
2016/0262188 A1  9/2016  Zhang et al.

(Continued)

OTHER PUBLICATIONS

Intel Corporation: "Remaining Details for Channel Access Mechanism for Autonomous UL Transmission", 3GPP Draft; R1-1802363 Remaining Details for Channel Access Mechanism for AUL, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 17, 2018 (Feb. 17, 2018), pp. 1-6, XP051397888, Retrieved from the Internet: URL: http://www.3gpp.org/ftp/tsg_ran/WG1_RL1/TSGR1_92/Docs/[retrieved on 2818-82-17].

(Continued)

*Primary Examiner* — Kwang B Yao
*Assistant Examiner* — Syed M Bokhari
(74) *Attorney, Agent, or Firm* — Qualcomm Incorporated

(57) ABSTRACT

Methods, systems, and devices for wireless communications are described that provide for frame-based initiator device operations. A wireless device may be operating within a frame-based equipment communications system, where a frame may include a channel occupancy time period and a minimum idle period. An initiating device may be configured to initiate autonomous uplink communications during the channel occupancy time period of its frame, while the device may not initiate communications during an idle period of its frame. In some cases, a frame-based equipment communications system may include more than one initiating device, where the idle periods for different initiating devices may occur at different times. In some cases, the initiating device may be configured to initiate communications during the idle period for another initiating device. This may allow the wireless system to decrease system overhead associated with a minimum idle period per frame.

30 Claims, 18 Drawing Sheets

Related U.S. Application Data

(60) Provisional application No. 62/663,197, filed on Apr. 26, 2018.

(58) Field of Classification Search
USPC .......................................................... 370/329
See application file for complete search history.

(56) References Cited

U.S. PATENT DOCUMENTS

| | | | |
|---|---|---|---|
| 2017/0135128 A1* | 5/2017 | Yerramalli | H04W 72/14 |
| 2017/0231011 A1 | 8/2017 | Park et al. | |
| 2019/0014591 A1 | 1/2019 | Lei | |
| 2019/0075581 A1 | 3/2019 | Salem et al. | |
| 2020/0305199 A1* | 9/2020 | Harada | H04W 74/0833 |

OTHER PUBLICATIONS

International Preliminary Report on Patentability—PCT/US2019/028736, The International Bureau of WIPO—Geneva, Switzerland, dated Nov. 5, 2020.

International Search Report and Written Opinion—PCT/US2019/028736—ISA/EPO—dated Jul. 10, 2019.

Nokia, et al., "On Channel Access for Autonomous UL Access", 3GPP Draft, 3GPP TSG-RAN WG1 Meeting #90, R1-1713861 AUL Channel Access, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051316655, 5 Pages, Retrieved from the Internet: URL: http://www.3gpp.org/ftp/Meetings_3GPP_SYNC/RAN1/Docs/ [retrieved on Aug. 20, 2017], Section 2.1.

Nokia Networks: "UL LBT and Configurable Frame Structure for UL/DL Operation", 3GPP Draft; R1-152817, 3rd Generation Partnership Project (3GPP), Mobile Competence Centre, 650, Route Des Lucioles ; F-06921 Sophia-Antipolis Cedex, France, vol. RAN WG1, No. Fukuoka, Japan; May 25, 2015-May 29, 2015, May 15, 2015 (May 15, 2015), 5 Pages, XP050969770, Retrieved from the Internet: URL: http://www.3gpp.org/ftp/tsg_ran/WG1_RL1/TSGR1_81/Docs/[retrieved on May 15, 2015], Section 2 and 3.

* cited by examiner

FRAME-BASED INITIATOR DEVICE OPERATION

CROSS REFERENCES

The present Application for Patent is a Continuation of U.S. patent application Ser. No. 16/391,001 by Yerramalli et al., entitled "Frame-Based Initiator Device Operation" filed Apr. 22, 2019, which claims the benefit of U.S. Provisional Patent Application No. 62/663,197 by Yerramalli et al., entitled "Frame-Based Initiator Device Operation," filed Apr. 26, 2018, assigned to the assignee hereof, and expressly incorporated by reference herein.

BACKGROUND

The following relates generally to wireless communications, and more specifically to frame-based initiator device operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a device (e.g., base station, UE) may be either a load based equipment (LBE) or frame-based equipment (FBE) device. If a device transmits as an LBE device, the device may use contention based access in order to access a channel medium for transmissions. Contention based access may include a clear channel assessment (CCA) procedure prior to gaining access to the channel. Alternatively, a FBE device may be configured with a periodic possible start time for transmissions. That is, the device may be configured with a frame period, where the beginning of each frame corresponds to a possible start time of a transmission by that device.

In some cases, devices using FBE may use a frame that includes a channel occupancy time (COT) period as well as an idle period. The idle period may include some minimum amount of time per frame period that an initiating device (e.g., a device that transmits via time-frequency resources without an explicit grant for use of the resources, a device that establishes control over an idle channel) may not transmit. In addition, the initiating device may not schedule a transmission by another device during the minimum idle period. In some cases, it may be desirable to decrease system overhead associated with a minimum idle time requirement within FBE systems.

SUMMARY

The present disclosure relates to methods, systems, devices, and apparatuses that support frame-based initiator device operation. Generally, the present disclosure provides for facilitating wireless communication in a frame-based equipment (FBE) communications system. The FBE communications system may include initiating devices and responding devices. An initiating device may have the capability to initiate communications without a grant scheduling the communications. A responding device may transmit in response to a grant or scheduling request from an initiating device.

According to some aspects, each initiating device may communicate according to a frame structure, which may be fixed in length for the specific device and may include a channel occupancy time (COT) period as well as a minimum idle period. An initiating device may be configured to perform (e.g., initiate) communications during the COT period and may remain idle (e.g., refrain from transmitting or receiving) during the idle period.

An FBE communications system may include more than one initiating device, where the idle periods for different initiating devices may occur at different times. In some cases, a first initiating device may be configured to initiate communications during the idle period of a second initiating device, during which the second initiating device may perform communications in response to the first initiating device even though the second initiating device is operating during its idle period. In some instances, an initiating device may transmit or receive according to a grant during its idle period. This may allow the wireless system to decrease system overhead associated with a minimum idle period per frame.

A method of wireless communication is described. The method may include determining a base station frame timing for communication initiated by a base station over a channel, the base station frame timing defining a duration of each of a set of base station-initiated frames, a starting time of the set of base station-initiated frames, or a combination thereof, determining a device frame timing for communicating as an initiator device over the channel, the device frame timing defining a duration of each of a set of device-initiated frames, an offset of the set of device-initiated frames relative to the set of base station-initiated frames, or a combination thereof, performing a listen-before-talk (LBT) procedure over the channel prior to a starting time of a first device-initiated frame of the set of device-initiated frames for an uplink transmission, and transmitting the uplink transmission to the base station within the first device-initiated frame based on the LBT procedure.

An apparatus for wireless communication is described. The apparatus may include a processor, memory coupled to the processor, and instructions stored in the memory. The instructions may be executable by the processor to cause the apparatus to determine a base station frame timing for communication initiated by a base station over a channel, the base station frame timing defining a duration of each of a set of base station-initiated frames, a starting time of the set of base station-initiated frames, or a combination thereof, determine a device frame timing for communicating as an initiator device over the channel, the device frame timing defining a duration of each of a set of device-initiated frames, an offset of the set of device-initiated frames relative to the set of base station-initiated frames, or a combination thereof, perform an LBT procedure over the channel prior to a starting time of a first device-initiated frame of the set of device-initiated frames for an uplink transmission, and transmit the uplink transmission to the base station within the first device-initiated frame based on the LBT procedure.

Another apparatus for wireless communication is described. The apparatus may include means for determining a base station frame timing for communication initiated by a base station over a channel, the base station frame timing defining a duration of each of a set of base station-initiated frames, a starting time of the set of base station-initiated frames, or a combination thereof, determining a device frame timing for communicating as an initiator device over the channel, the device frame timing defining a duration of each of a set of device-initiated frames, an offset of the set of device-initiated frames relative to the set of base station-initiated frames, or a combination thereof, performing an LBT procedure over the channel prior to a starting time of a first device-initiated frame of the set of device-initiated frames for an uplink transmission, and transmitting the uplink transmission to the base station within the first device-initiated frame based on the LBT procedure.

A non-transitory computer-readable medium storing code for wireless communication is described. The code may include instructions executable by a processor to determine a base station frame timing for communication initiated by a base station over a channel, the base station frame timing defining a duration of each of a set of base station-initiated frames, a starting time of the set of base station-initiated frames, or a combination thereof, determine a device frame timing for communicating as an initiator device over the channel, the device frame timing defining a duration of each of a set of device-initiated frames, an offset of the set of device-initiated frames relative to the set of base station-initiated frames, or a combination thereof, perform an LBT procedure over the channel prior to a starting time of a first device-initiated frame of the set of device-initiated frames for an uplink transmission, and transmit the uplink transmission to the base station within the first device-initiated frame based on the LBT procedure.

According to some aspects, the method, apparatuses, and non-transitory computer-readable medium described herein may further include operations, features, means, or instructions for receiving, from the base station, a control transmission over the channel within a first base station-initiated frame, the control transmission indicating an availability of the first device-initiated frame within the first base station-initiated frame.

According to some aspects, the method, apparatuses, and non-transitory computer-readable medium described herein may further include operations, features, means, or instructions for receiving, from the base station, a control transmission over the channel within a first base station-initiated frame, the control transmission including a grant for transmitting a base station-initiated uplink transmission or receiving a downlink transmission from the base station over a set of scheduled resources within the first base station-initiated frame.

According to some aspects, the method, apparatuses, and non-transitory computer-readable medium described herein may further include operations, features, means, or instructions for refraining from transmitting during the second device-initiated frame.

According to some aspects, the method, apparatuses, and non-transitory computer-readable medium described herein may further include operations, features, means, or instructions for entering an idle mode of operation after transmitting the uplink transmission, identifying data to be transmitted in a second uplink transmission, identifying physical random access channel (PRACH) resources in the channel based on an access of the channel by the base station during a first base station-initiated frame and transmitting a PRACH to the base station based on the PRACH resources and the device frame timing.

According to some aspects, the method, apparatuses, and non-transitory computer-readable medium described herein may further include operations, features, means, or instructions for receiving, from the base station, a configuration for operation over a subset of frequency resources of the channel, where the LBT procedure and the uplink transmission may be over the subset of frequency resources.

According to some aspects of the method, apparatuses, and non-transitory computer-readable medium described herein, the channel may be located in a shared radio frequency spectrum band.

According to some aspects of the method, apparatuses, and non-transitory computer-readable medium described herein, the duration of each of the set of base station-initiated frames may be longer than the duration of each of the set of device-initiated frames.

According to some aspects of the method, apparatuses, and non-transitory computer-readable medium described herein, the duration of each of the set of base station-initiated frames may be a multiple of the duration of each of the set of device-initiated frames.

According to some aspects of the method, apparatuses, and non-transitory computer-readable medium described herein, the set of base station-initiated frames include respective idle periods.

According to some aspects of the method, apparatuses, and non-transitory computer-readable medium described herein, the uplink transmission at least partially overlaps in time with one of the respective idle periods.

According to some aspects of the method, apparatuses, and non-transitory computer-readable medium described herein, the uplink transmission includes a scheduling request (SR), a PRACH, a periodic channel state information (CSI) report, a semi-persistent CSI report, a physical uplink control channel (PUCCH), a physical uplink shared channel (PUSCH), or an autonomous uplink (AUL) transmission.

A method of wireless communication is described. The method may include determining a base station frame timing for communicating with a set of devices over a channel, the base station frame timing defining a duration of each of a set of base station-initiated frames, a starting time of the set of base station-initiated frames, or a combination thereof, configuring the set of devices with respective device frame timings for operation as initiator devices over the channel, each device frame timing defining a duration of each of a set of device-initiated frames, an offset of the set of device-initiated frames relative to the set of base station-initiated frames, or a combination thereof, and communicating with at least one of the set of devices based on the respective device frame timings.

An apparatus for wireless communication is described. The apparatus may include a processor, memory coupled to the processor, and instructions stored in the memory. The instructions may be executable by the processor to cause the apparatus to determine a base station frame timing for communicating with a set of devices over a channel, the base station frame timing defining a duration of each of a set of base station-initiated frames, a starting time of the set of base station-initiated frames, or a combination thereof, configure the set of devices with respective device frame timings for operation as initiator devices over the channel, each device frame timing defining a duration of each of a set of device-initiated frames, an offset of the set of device-initiated frames relative to the set of base station-initiated frames, or a combination thereof, and communicate with at least one of the set of devices based on the respective device frame timings.

Another apparatus for wireless communication is described. The apparatus may include means for determining a base station frame timing for communicating with a set of devices over a channel, the base station frame timing defining a duration of each of a set of base station-initiated frames, a starting time of the set of base station-initiated frames, or a combination thereof, configuring the set of devices with respective device frame timings for operation as initiator devices over the channel, each device frame timing defining a duration of each of a set of device-initiated frames, an offset of the set of device-initiated frames relative to the set of base station-initiated frames, or a combination thereof, and communicating with at least one of the set of devices based on the respective device frame timings.

A non-transitory computer-readable medium storing code for wireless communication is described. The code may include instructions executable by a processor to determine a base station frame timing for communicating with a set of devices over a channel, the base station frame timing defining a duration of each of a set of base station-initiated frames, a starting time of the set of base station-initiated frames, or a combination thereof, configure the set of devices with respective device frame timings for operation as initiator devices over the channel, each device frame timing defining a duration of each of a set of device-initiated frames, an offset of the set of device-initiated frames relative to the set of base station-initiated frames, or a combination thereof, and communicate with at least one of the set of devices based on the respective device frame timings.

According to some aspects, the method, apparatuses, and non-transitory computer-readable medium described herein may further include operations, features, means, or instructions for performing an LBT procedure over the channel prior to a first base station-initiated frame of the set of base station-initiated frames and communicating, as an initiator device, with at least one of the set of devices within the first base station-initiated frame based on the LBT procedure.

According to some aspects, the method, apparatuses, and non-transitory computer-readable medium described herein may further include operations, features, means, or instructions for transmitting a control transmission over the channel within the first base station-initiated frame, the control transmission indicating an availability of the plurality of device-initiated frames within the first base station-initiated frame.

According to some aspects, the method, apparatuses, and non-transitory computer-readable medium described herein may further include operations, features, means, or instructions for transmitting a control transmission over the channel within the first base station-initiated frame, where the control transmission includes a grant of a set of scheduled resources for at least one of the set of devices for an uplink transmission or a downlink transmission.

According to some aspects, the method, apparatuses, and non-transitory computer-readable medium described herein may further include operations, features, means, or instructions for configuring PRACH resources in the channel based on the LBT procedure, receiving a PRACH from an idle device over the PRACH resources and configuring the idle device with a device frame timing for operation as an initiator device over the channel.

According to some aspects, the method, apparatuses, and non-transitory computer-readable medium described herein may further include operations, features, means, or instructions for transmitting, to at least one of the set of devices, a configuration to operate over a subset of frequency resources of the channel.

According to some aspects of the method, apparatuses, and non-transitory computer-readable medium described herein, the channel may be located in a shared radio frequency spectrum band.

According to some aspects of the method, apparatuses, and non-transitory computer-readable medium described herein, the duration of each of the set of base station-initiated frames may be longer than the duration of each of the set of device-initiated frames.

According to some aspects of the method, apparatuses, and non-transitory computer-readable medium described herein, the duration of each of the set of base station-initiated frames may be a multiple of the duration of the set of device-initiated frames.

According to some aspects of the method, apparatuses, and non-transitory computer-readable medium described herein, each of the set of base station-initiated frames includes a respective idle period.

According to some aspects of the method, apparatuses, and non-transitory computer-readable medium described herein, communicating with at least one of the set of devices may include operations, features, means, or instructions for receiving an uplink transmission over a set of resources that at least partially overlaps in time with an idle period of a first base station-initiated frame of the set of base station-initiated frames.

According to some aspects of the method, apparatuses, and non-transitory computer-readable medium described herein, communicating with at least one of the set of devices may include operations, features, means, or instructions for receiving an SR, a PRACH, a periodic CSI reporting, a semi-persistent CSI reporting, a PUCCH, a PUSCH, or an AUL transmission.

DETAILED DESCRIPTION

Generally, the present disclosure provides for configuring devices within a frame-based equipment (FBE) communication system that supports communication techniques for multiple initiating devices. For example, a base station may configure a user equipment (UE) as an initiating FBE device. The base station may configure the UE (e.g., via one or more configuration messages) to operate as an initiating device using a frame spanning a frame period and including a channel occupancy time (COT) and an idle period. The COT and idle period of the UE may differ than the COT and idle period associated with a frame of the base station. For example, the UE may have frame with a shorter COT and idle period than a frame associated with the base station and in some cases, the frame of the UE and the base station may not align in time.

In some aspects, once configured as an initiating device, a UE may initiate communications during the idle period for another initiating device (e.g., a base station). Such a configuration may reduce the overall idle time of the wireless communications system and increase throughput. Additionally, the base station (or other network node) may configure multiple devices (e.g., in an industrial internet of things (IIoT) environment) to operate according to different frame structures.

Aspects of the disclosure are initially described in the context of wireless communications systems. Aspects are then described with respect to a frame structure and a process flow. Aspects of the disclosure are further illustrated by and described with reference to apparatus diagrams, system diagrams, and flowcharts that relate to frame-based initiator device operation.

Figure 1:
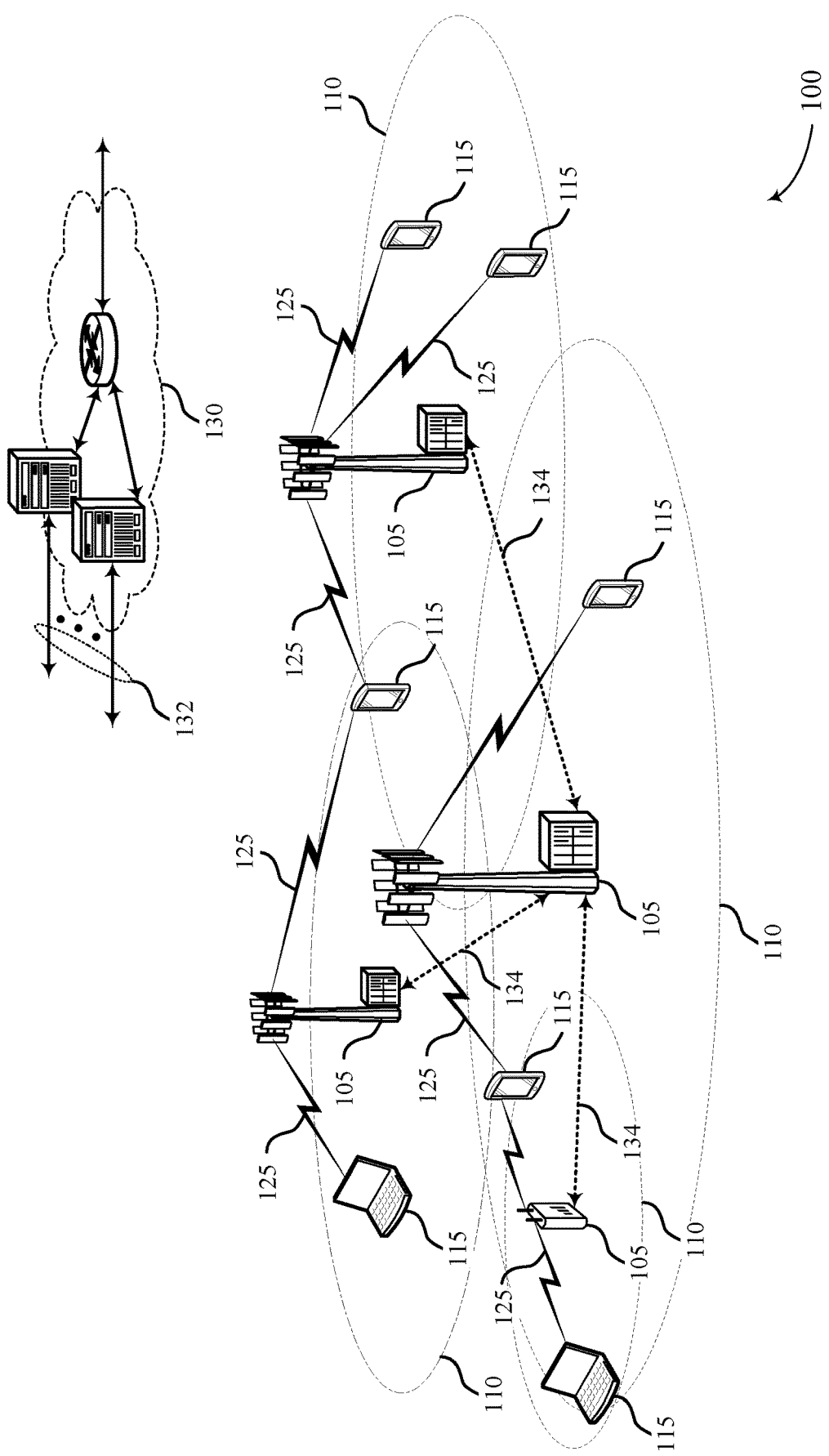
FIGS. 1 through 4 illustrate examples of a wireless communications system that supports frame-based initiator device operation in accordance with aspects of the present disclosure.

FIG. 1 illustrates an example of a wireless communications system 100 that supports frame-based initiator device operation in accordance with aspects of the present disclosure. The wireless communications system 100 includes base stations 105, UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some aspects, a base station 105 may be movable and therefore provide communication coverage for a moving geographic coverage area 110. In some aspects, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some aspects, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some aspects, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or may be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands. For example, wireless communications system 100 may operate in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some aspects, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel (e.g., a predefined channel bandwidth, a carrier bandwidth, or a bandwidth part (BWP)) is clear before transmitting data. The LBT procedure may involve a device (e.g., a base station 105 or UE 115) monitoring a channel (e.g., detecting signal energy on the channel) to determine the use of the channel by other devices prior to a possible transmission. If the device determines there is an acceptable level of interference (e.g., no signal energy is detected on the channel, the detected signal energy is below a certain threshold), the device may proceed with a transmission. Alternatively, if the device detects an undesirable level of interference (e.g., the detected signal energy exceeds a certain threshold), the device may abstain from transmitting. In some cases, operations in unlicensed bands may be based on a carrier aggregation configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some aspects, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one aspect, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some aspects a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some aspects, signal waveforms transmitted over a carrier may be made up of multiple sub-carriers (e.g., using multi-carrier modulation (MCM) techniques such as orthogonal division frequency multiplexing (OFDM) or discrete Fourier transform-spread-OFDM (DFT-S-OFDM).

The organizational structure of the carriers may be different for different radio access technologies (LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some aspects (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some aspects, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some aspects the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some aspects, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some aspects, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system and may utilize any combination of licensed, shared, and unlicensed spectrum bands, among others. The flexibility of eCC symbol duration and subcarrier spacing may allow for the use of eCC across multiple spectrums. In some aspects, NR shared spectrum may increase spectrum utilization and spectral efficiency, specifically through dynamic vertical (e.g., across the frequency domain) and horizontal (e.g., across the time domain) sharing of resources.

In some cases, a device (e.g., base station 105, UE 115) may be either a load based equipment (LBE) or FBE device. If a device transmits as an LBE device, the device may use contention based access in order to access a channel medium for transmissions. Contention based access may include carrier sense multiple access/collision avoidance (CSMA/CA) techniques in which a device having a packet for transmission checks to see if a channel is clear (e.g., free from use by other devices) before transmitting the packet. One example of a CSMA/CA technique may be an LBT procedure which may be performed by a device prior to performing a transmission on a channel. CSMA/CA (e.g., an LBT procedure) may involve mechanisms such as clear channel assessment (CCA) or extended CCA, which may be performed by a device prior to gaining access to the channel to promote fairness in access to the channel by multiple devices operating in an LBE mode. In a CCA procedure, a device may monitor a channel during an LBT period based on a CCA timer and once the timer expires and the channel is clear, the device may transmit the packet over the channel. During an extended CCA procedure, a device may monitor a channel for a given period (e.g., an LBT period or a CCA period) as well as a defer period, after which time a device may monitor one or more time durations (e.g., symbols, mini-slots, slots) during a back-off time before transmitting the packet.

Systems that support FBE communications may include one or more devices configured as FBE devices. For example, a wireless device such as an access point (AP) or a base station 105 may operate as an FBE device which may be configured with possible transmission start times that occur periodically. That is, the device may be configured with a frame having a given period, where the beginning of each frame corresponds to a possible start time of a transmission by that device. Prior to a possible start time, the device may utilize an LBT procedure to determine if the medium is free. The LBT procedure may be a one-shot LBT instead of monitoring the channel according to a CCA timer. The one-shot LBT procedure may include a device listening to a channel medium (e.g., over one or more symbols) for any interference prior to transmitting on that channel.

If the device determines there are no interfering communications occurring during its LBT (or that the interference is below a certain threshold) prior to one of the possible start times, the device may transmit (e.g., at the transmission start time following the one-shot LBT procedure). If a device transmits at its possible start time, the device may establish access to the channel medium for up to the entirety of a COT of its frame period. Wireless communications system 100 may utilize FBE base stations 105 that are managed by a single operator. In some cases, the base station frame periods may have the same length and the same start times throughout the wireless communications system 100, or some base stations 105 may be synchronized while others operate asynchronously.

Devices operating as FBEs may use a frame that includes a COT period as well as an idle period. The idle period may include some minimum amount of time per frame period that an initiating device (i.e., a device that establishes control over the channel for transmissions) may not transmit. In addition, the initiating device may not schedule communications by another device within the minimum idle period. The minimum idle period may be given by at least 5% of the total frame period or in some cases, 100 microseconds (μs). In this example, frame periods smaller than 2 ms may accrue a larger idle overhead due to the minimum 100 μs idle period. In the case that multiple base stations 105 have the same frame period with the same start time, the idle period may align for the multiple base stations 105.

In an FBE system, a base station 105 may operate according to a fixed frame period. Prior to each frame (i.e., at the end of the idle time of the previous frame), the initiating device may use LBT (e.g., one-shot LBT) to determine if the medium is free for access. If the initiating device determines that the channel is free (e.g., signal energy on the channel is below a threshold), the device may begin transmitting at the start of its frame period (i.e., its possible start time). In this example, the initiating device may utilize the channel medium for any communications for the duration of the COT associated with that frame period. If the initiating device detects that the channel is not free or does not begin transmitting at its frame boundary, the device may wait until the start of its next frame period before transmitting.

In some cases, rather than accessing the channel medium as a responding device (e.g., a device that performs communication in response to signaling from another FBE device), a UE 115 may initiate communication over the medium. As an initiating device, the UE 115 may be either an LBE or FBE device. That is, the UE 115 may either gain access to the channel using contention-based access or frame-based access. When a UE 115 uses frame-based access (i.e., the UE 115 operates in an FBE mode), the UE 115 may also use a frame period including a COT and idle period, and use a one-shot LBT procedure prior to frame boundaries to determine whether the channel medium is clear for transmission by the UE 115. In some cases, a network may restrict an access mode for UEs 115 operating on the network. For example, a UE 115 may not be able to access the medium as both an LBE and FBE device. In some cases, a single operator FBE system may restrict UEs 115 to only operate in an FBE mode.

Figure 2:
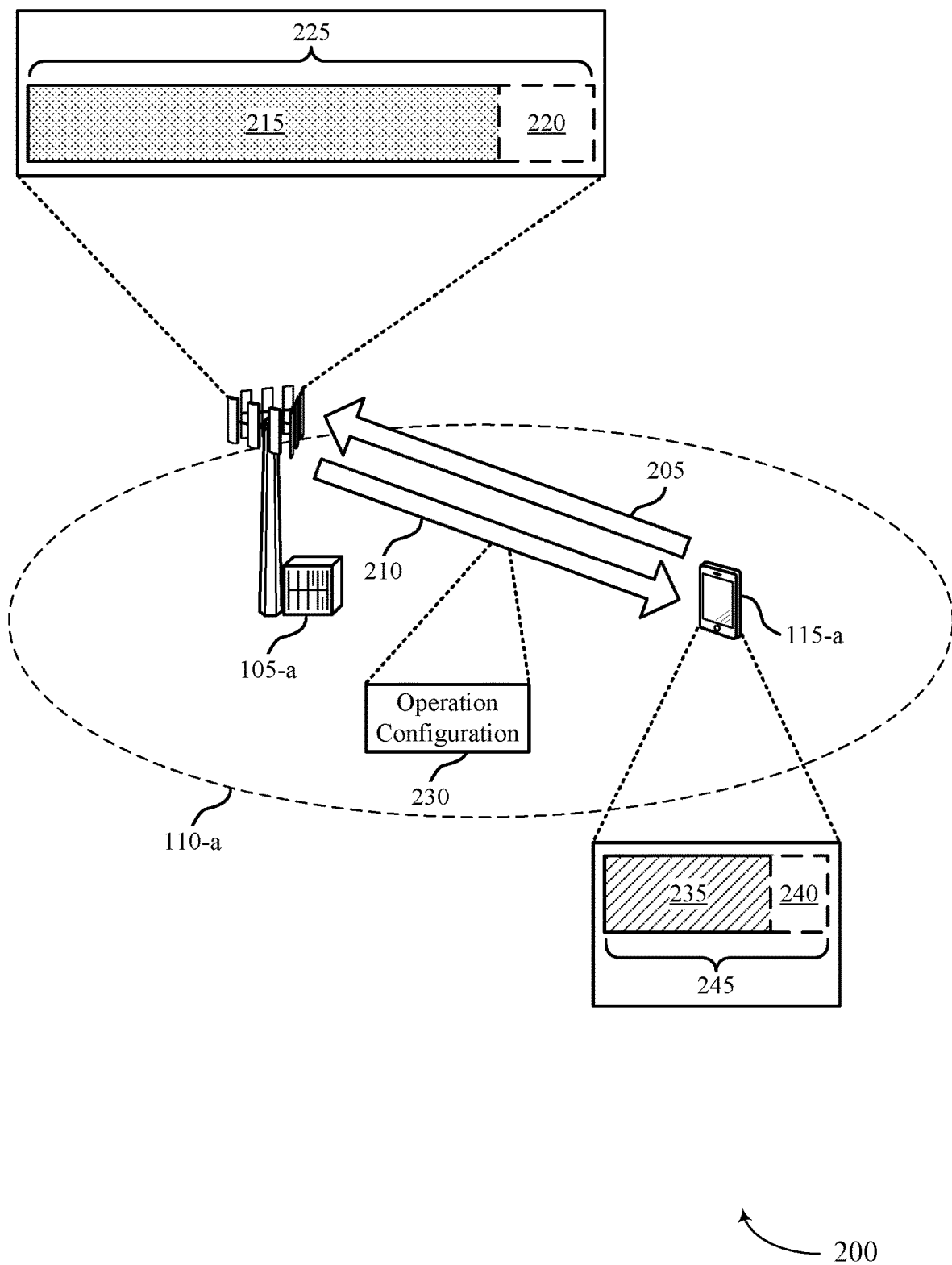

FIG. 2 illustrates an example of a wireless communications system 200 that supports frame-based initiator device operation in accordance with aspects of the present disclosure. In some aspects, wireless communications system 200 may implement aspects of wireless communications system 100. For example, base station 105-a may operate as an FBE device within a single operator environment. Additionally, UE 115-a may be configured as an FBE device that may transmit autonomously.

In some aspects, base station 105-a may operate according to frame 225 that includes a COT 215 and an idle period 220. For instance, base station 105-a may transmit via downlink channel 210 and schedule uplink transmissions via uplink channel 205 during the COT 215. Base station 105-a may then observe a minimum idle time during idle period 220. During idle period 220, base station 105-a may not transmit via downlink channel 210 as an initiating device and the base station 105-a may not schedule any uplink transmissions during the idle period 220.

According to some aspects, base station 105-a may perform a one-shot LBT procedure prior to the beginning of frame 225 to determine if the communication channel is clear of interference. In some cases, base station 105-a may determine the channel is clear and transmit an operation configuration 230 to UE 115-a during COT 215 of frame 225. In other aspects, base station 105-a may transmit the operation configuration 230 to one or more UEs 115 via dedicated control channel resources separate from the frame 225 (e.g., via a different carrier of a multiple carrier or carrier aggregation configuration). Operation configuration 230 may include information for configuring UE 115-a as an FBE initiating device and may indicate a frame configuration for the UE 115-a. For instance, the frame configuration may indicate a frame 245 having a COT 235 and an idle period 240.

When UE 115-a is configured as an initiating device, UE 115-a may be permitted to transmit autonomous uplink (AUL) transmissions via uplink channel 205 without receiving an explicit grant from base station 105-a. This may allow UE 115-a to transmit a scheduling request (SR), a physical uplink control channel (PUCCH), a physical uplink shared channel (PUSCH), or channel state information (CSI) reports, as well as other types of transmissions, without receiving a grant. For example, UE 115-a may autonomously transmit CSI reporting, where the reporting may be periodic or semi-persistent. UE 115-a may also transmit a physical random access channel (PRACH) (e.g., via AUL). In some cases, UE 115-a may transmit PRACH in both connected mode or idle mode and may utilize resources within COT 235 that are configured by base station 105-a as PRACH resources.

Operation configuration 230 may include information for configuring a frame structure for UE 115-a. For example, operation configuration 230 may indicate to UE 115-a a start time, an offset (e.g., a time offset with respect to a frame 225 of base station 105-a), a frame duration, or a periodicity of occurrence for frame 245. In some cases, the operation configuration 230 may indicate (e.g., via a bitmap) a set of frames (e.g., contiguous or non-contiguous) allocated for the UE 115-a. The configuration of frame 245 may be unique to UE 115-a or, alternatively, may be common between a group of UEs 115. In some cases, frame 245 for UE 115-a may be formatted similar to frame 225 of base station 105-a. For example, frame 245 may also have a minimum amount idle period 240 associated with each frame 245. The idle period 240 may include an amount of time (e.g., 5% of the frame period, or at least 100 μs per frame period). During the idle period 240, UE 115-a may not transmit or schedule any communications.

Operation configuration 230 may indicate a subset of frames 245 that are to be inactive. That is, UE 115-a may only be able to transmit autonomously on active frames 245. In some cases, base station 105-a may preconfigure a subset of frames 245 that are to be inactive. For example, operation configuration 230 may include an integer N that indicates to UE 115-a every N frames 245 that are active. In other aspects, operation configuration 230 may include some other type of indication that communicates to UE 115-a if one or more frames 245 are to be inactive. In other cases, base station 105-a may dynamically indicate to UE 115-a which of its frames 245 are active or inactive. In this example, base station 105-a may transmit a trigger signal (e.g., via a physical downlink control channel (PDCCH) or other physical control channel outside of operation configuration 230) to UE 115-a, indicating whether frames 245 within frame 225 of the base station are to be active.

In some cases, the initiating UE 115-a or group of initiating UEs 115 may have a frame 245 that is the same duration as the frame 225 associated with base station 105-a. In other instances, the initiating UE(s) 115-a may have frame 245 durations that are smaller than that of the base station frame 225. In such cases, each UE 115 may have multiple frame periods within a single base station frame 225. For example, the base station frame period may be an integer multiple of the frame periods configured for each UE 115, and different frame periods may be configured for different UEs or groups of UEs 115.

According to some aspects, at least one COT period 235 for UE 115-a may occur during idle period 220 of the base station frame 225. In such cases, base station 105-a may communicate during its idle period 220 if responding to signaling (e.g., transmission of ACK/NACK information) or other requests from UE 115-a that occurs during COT 235 associated with UE 115-a.

Figure 3:
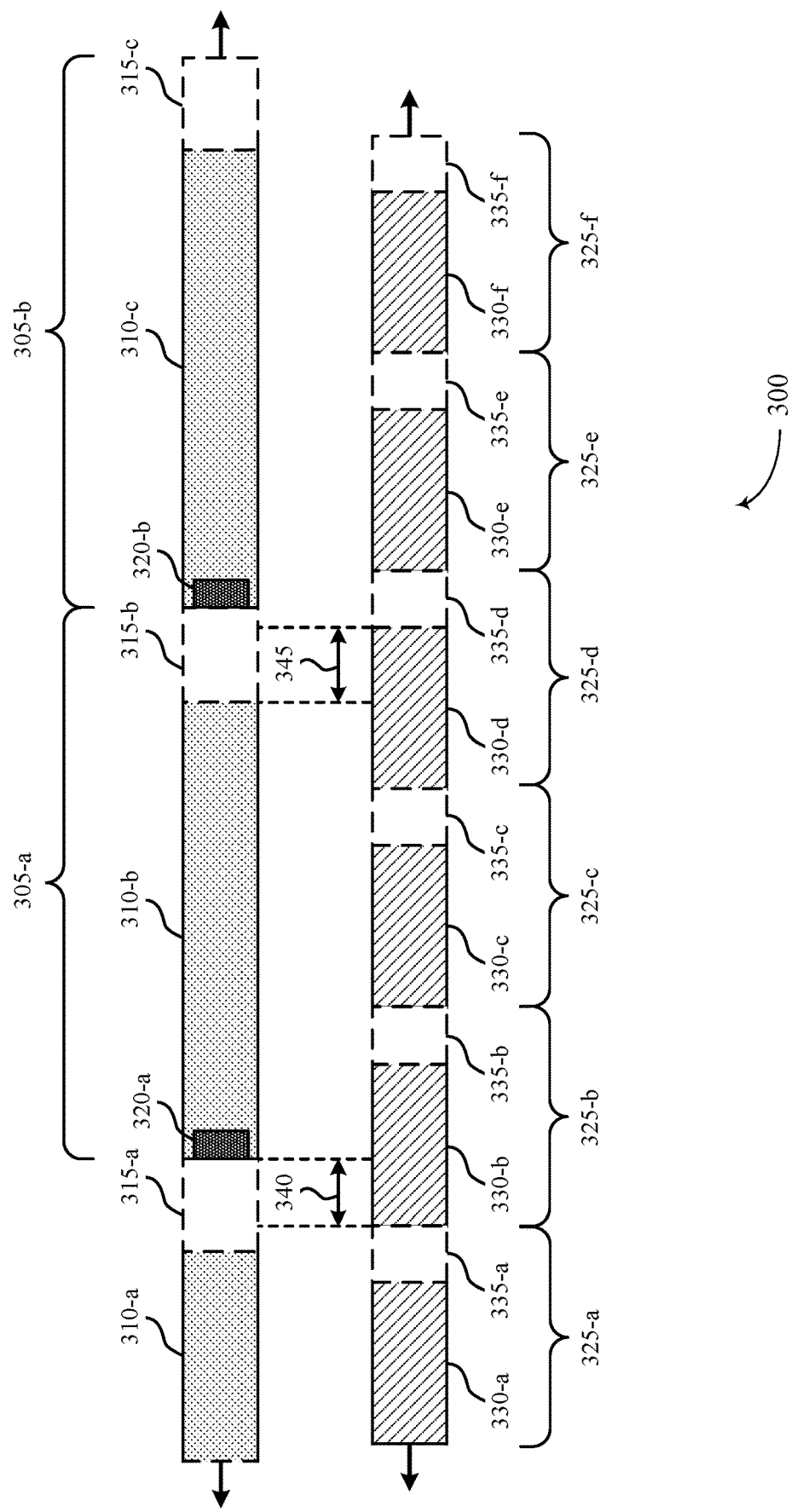

FIG. 3 illustrates an example of a frame structure 300 that supports frame-based initiator device operation in accordance with aspects of the present disclosure. In some aspects, frame structure 300 may be implemented by aspects of wireless communications systems 100 or 200. For example, frames 305 may correspond to frames for a base station 105 that operates as an FBE device within a single operator environment while frames 325 may correspond to frames for a UE 115 that operates as an FBE device, which may be capable of performing AUL transmissions.

In some aspects, frames 305 may represent a frame structure for an FBE base station. Each frame 305 may include a COT period 310 and a minimum idle period 315. During COT period 310, control resources 320 may be allocated for transmission of control information to one or more UEs in communication with the base station. For example, a base station may perform transmission via control resources 320 at the beginning of frame 305, which may include a resource allocation for one or more UEs granting the UE(s) access to time-frequency resources of the channel during COT period 310 to perform uplink or receive downlink transmissions. Control resources 320 may also include a timing indication for frame 305.

Prior to gaining access to the channel during frame 305-*a*, a base station may perform a one-shot LBT within idle period 315-*a*. After determining the channel is clear of communications from other devices, the base station may transmit control information 320-*a* at the beginning of frame 305-*a*. Control information 320-*a* may include information related to resource allocation for the remainder of the COT period 310-*b*. Control information 320-*a* may also include frame configuration information (e.g., a slot format indicator (SFI)) for one or more initiating UEs in communication with the base station.

Frames 325 may represent a frame structure for an FBE UE, where the frame includes COT period 330 and minimum idle period 335. In some cases, a UE may receive some information via control information 320 from a base station. The control information may indicate to the UE a subset of frames 325 that are to be inactive. For example, control information 320-*a* may indicate a transmission scheduled during one of frames 325-*a*, 325-*b*, or 325-*c*. In some cases, the control information may indicate that one or more frames are inactive and therefore unable to be used for AUL. For instance, the base station may indicate that frames 325-*d*, 325-*e*, and 325-*f* are inactive and therefore unable to be used for communications (e.g., transmission via AUL).

In some aspects, there may be a period 340 or 345 that corresponds to a COT period 330 for a UE that at least partially overlaps with an idle period 315 for a base station. In some cases, a UE transmit an AUL within an active frame 325. For example, a UE may transmit an AUL within COT period 330-*d* of frame 325-*d*. In some cases, the AUL may include signaling that triggers a response from the base station. In such instances, the base station may respond during time 345 within idle period 315-*b* because it is responding to a UE-initiated communication. In this example, idle period 315-*b* corresponds to a period where a base station may not initiate any communications. However, the base station may still respond to a communication initiated by a different device within the different device's COT period 330-*d*.

The UE may transmit an AUL within base station frames 305 for which the base station accesses the channel, and within base station frames 305 for which the base station does not access the channel (e.g., because the channel is busy during the one-shot LBT performed by the base station before the base station frame 305 or because the base station chooses not to transmit during the base station frame 305).

In some aspects, an initiating device may act as a responding device in communications with a different initiating device. However, if a device acts as a responding device during its idle period (e.g., idle period 315, idle period 335), the device may not initiate a transmission at the beginning of its following COT period (e.g., COT period 310, COT period 330). For example, the UE may be configured by the base station with a grant that overlaps its idle period 335-*b*, and thus may not transmit during the following frame 325-*c*.

In some cases, multiple base stations may be present in a communications system operating according to FBE. The multiple base stations may be configured with the same base station frame timing, and in some cases may coordinate UE frame timing. For example, each base station may configure UEs with the same frame timing, or may configure UEs served by either one of the base stations to each have different offsets relative to the base station frames (e.g., so UEs connected to different base stations also have different offsets).

Figure 4:
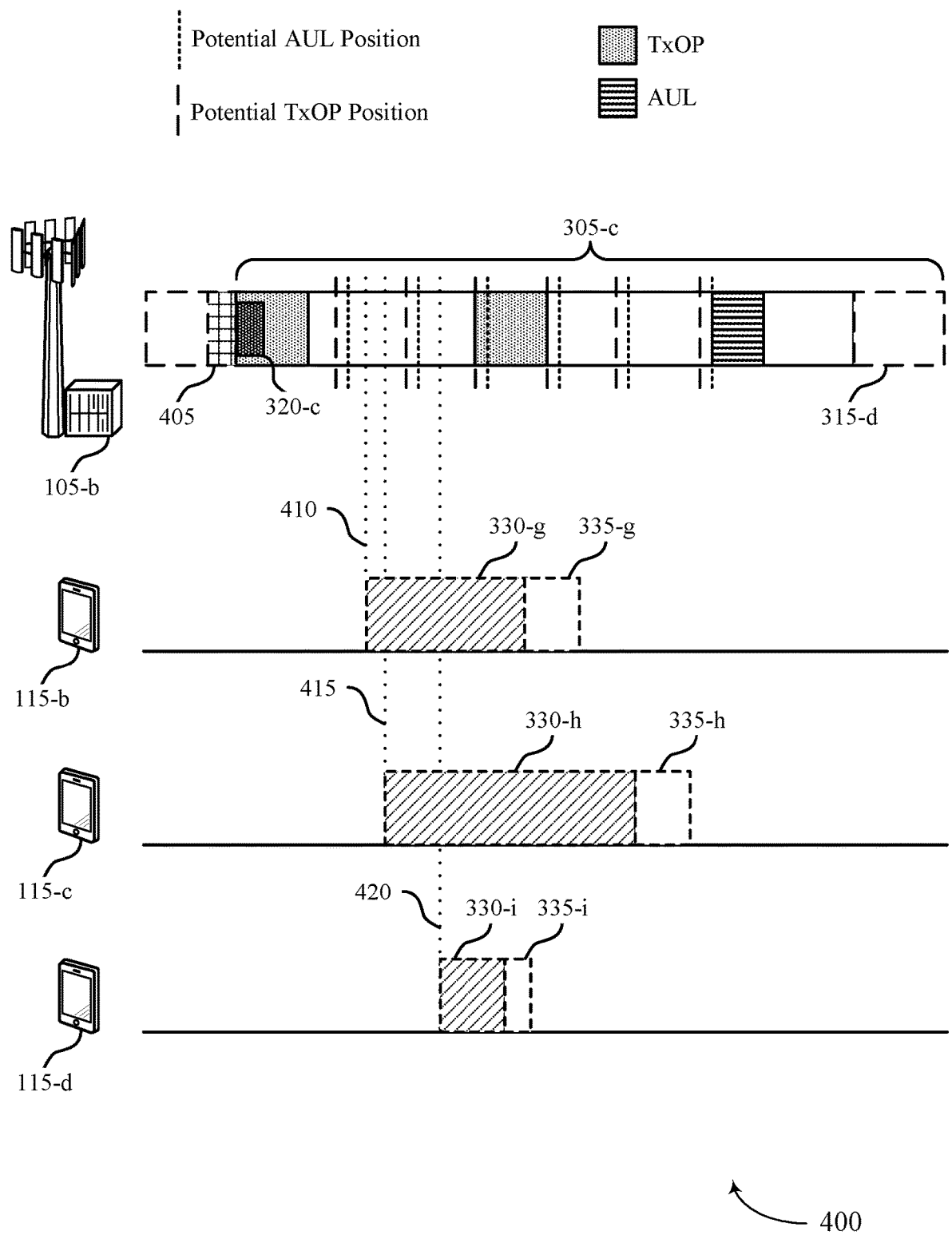

FIG. 4 illustrates an example of a wireless communications system 400 that supports frame-based initiator device operation in accordance with aspects of the present disclosure. In some aspects, wireless communications system 400 may be implemented by aspects of wireless communications systems 100 or 200. For example, base station 105-*b* may operate as an FBE device within a single operator environment. Additionally, UEs 115 may be configured as FBE devices that may transmit autonomously.

In some cases, base station 105-*b* may communicate over frame 305-*c*. Prior to any transmissions, base station 105-*b* may engage in a one-shot LBT operation at 405 to ensure the channel is clear of interference. If the channel is clear, base station 105-*b* may then access the channel and transmit control information 320-*c*, which may indicate resource allocation for the remainder of frame 305-*c*. Base station 105-*b* may transmit according to the indicated resource allocations for downlink transmissions, or may transmit during a transmission opportunity (TxOP). In some cases, the TxOPs may have predetermined start times in frame 305-*c*, while in other cases TxOPs may start at any position within frame 305-*c*. In some cases, control information 320-*c* may indicate TxOPs for downlink transmissions during frame 305-*c*. If base station 105-*b* desires to send any additional data during frame 305-*c*, base station 105-*b* may utilize the potential TxOPs.

In some cases, base station 105-*b* may be in communication with several UEs 115-*b*, 115-*c*, and 115-*d*. Each of the UEs 115 may be configured with the same or different frame configurations for AUL. For example, UEs 115 may be configured with a same frame duration for AUL but different offsets such that the UE 115 frame timings have staggered start times. That is, UE 115-*b* may be configured with a start time at 410, UE 115-*c* may be configured with a start time at 415, and UE 115-*d* may be configured with a start time at 420.

In some cases, base station 105-*b* may transmit beyond the confines of an initial configured TxOP position. In some cases, base station 105-*b* may configure potential additional TxOPs to occur before potential AUL positions. That is, if base station 105-*b* utilizes a potential TxOP for an unscheduled downlink transmission, a UE 115 may not engage in a potential AUL. In some cases, if a UE 115 uses a one-shot LBT procedure prior to transmitting an AUL, TxOPs that are used by base station 105-*b* would block AUL transmissions having start times overlapping with the occupied TxOPs.

In some cases, base station 105-*b* may extend a TxOP beyond the scheduled TxOP position. For example, base station 105-*a* may identify additional downlink data and extend a TxOP without having to contend for frame resources with AUL transmissions. Base station 105-b may extend a TxOP up to the beginning of idle period 315-d. In other cases, base station 105-a may indicate within control information 320-c a subset of frames (and corresponding COT periods 330 and minimum idle periods 335) that may be inactive for UEs 115. Base station 105-b may send this notification via PDCCH signaling (e.g., within a common search space), or some other control signaling such as an SFI.

Figure 5:
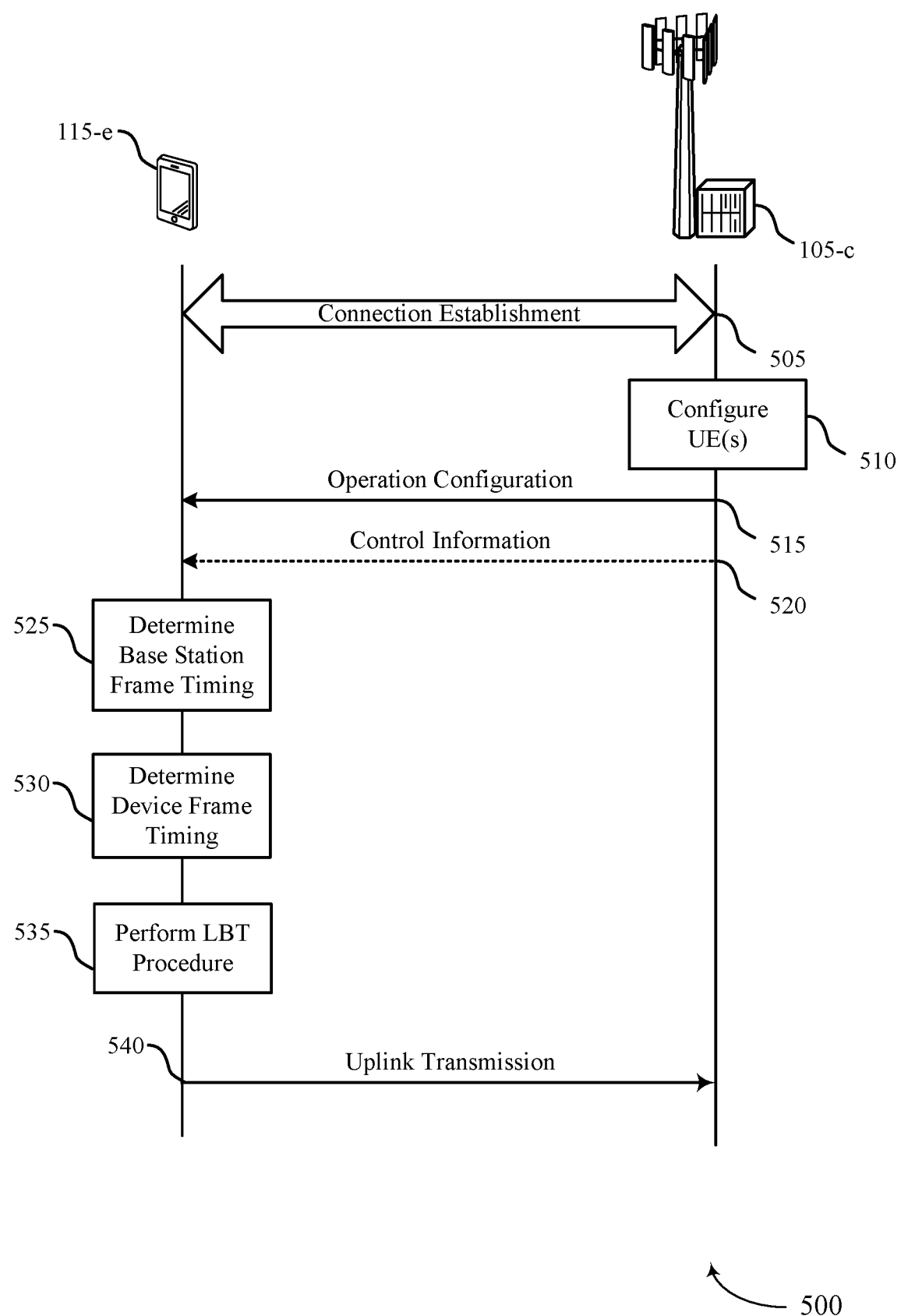
FIG. 5 illustrates an example of a process flow that supports frame-based initiator device operation in accordance with aspects of the present disclosure.

FIG. 5 illustrates an example of a process flow 500 that supports frame-based initiator device operation in accordance with aspects of the present disclosure. In some aspects, process flow 500 may be implemented by aspects of wireless communications systems 100 or 200 using the FBE techniques as shown in FIGS. 3 and 4. For example, base station 105-c may operate as an FBE device within a single operator environment. Additionally, UE 115-e may be configured as an FBE device, which may perform autonomous transmissions.

At 505, a connection is established between base station 105-c and UE 115-e. The connection may be a wireless link that supports communications between base station 105-c and UE 115-e. In some cases, the connection may be established via a random access procedure. For instance, a base station may convey a set of PRACH resources (via broadcast signaling, system information (SI), PDCCH) to the UE 115-e. After identifying the PRACH resources, UE 115-e may transmit a random access request message via the PRACH resources, which may indicate to the base station 105-c that the UE 115-e wishes to establish a connection. Base station 105-c may determine to transmit a random access response message indicating connection establishment.

At 510, base station 105-c may configure one or more UEs in the system including UE 115-e. In some cases, the configuration of UE 115-e may involve determining a frame configuration for the UE 115-e and configuring the UE 115-e to operate as an FBE device.

At 515 the base station 105-c may transmit an operation configuration to UE 115-e. The operation configuration may include an indication of a frame timing such as a frame duration and offset from a base station frame. The operation configuration may also specify that the frame for UE 115-e includes a COT period and an idle period. In some cases, the operation configuration may indicate a set of frequency resources (e.g., a channel, a BWP) over which the UE 115-e may communicate. The operation configuration may convey LBT resources and AUL resources for the UE 115-e. For example, the operation configuration may include information related to frame timing for the UE 115-e, which may be used by the UE 115-e to determine LBT resources for gaining access to a channel. The LBT resources may be a set of resources prior to the start of the frame for UE 115-e, which may be used by the UE 115-e to perform LBT. The operation configuration may also indicate resources within a frame of the base station 105-c that may be utilized by UE 115-e for AUL transmissions.

At 520, the base station 105-c may optionally transmit control information to UE 115-e. The control information may indicate resources available for use by the UE 115-e or may be used to schedule one or more communications between the base station 105-c and the UE 115-e. The control information may be transmitted in a set of time-frequency resources of the base station frame (e.g., the first 1, 2, or 3 symbols of the base station frame), which may be monitored by UE 115-e.

At 525, UE 115-e may determine a base station 105-c frame timing for communication initiated by the base station over a channel. In some cases, the base station timing may define a duration of each of a plurality of base station-initiated frames, a starting time of the plurality of bae station-initiated frames, or a combination thereof. In some aspects, the plurality of base station-initiated frames may include respective idle periods and the channel may be located in a shared radio frequency spectrum band. In some cases, the base station 105-c may broadcast an indication of the base station 105-c frame timing (e.g., via synchronization signals, discovery reference signals, or system information). After receiving the indication from the base station 105-c, the UE 115-e may determine the base station 105-c frame timing.

At 530, UE 115-e may determine a device frame timing for communicating as an initiator device over the channel. In some cases, base station 105-c may transmit an indication of the device frame timing (e.g., via control information) within a frame configuration for UE 115-e. Based on the frame configuration, the UE 115-c may determine the device frame timing. For example, the device frame timing may define a duration of each of a plurality of a device-initiated frames, an offset of the plurality of device-initiated frames relative to the plurality of base station-initiated frames relative to the plurality of base station-initiated frames, or a combination thereof, which may be used by the UE 115-e to determine device frame timing. In some cases, the duration of each of the plurality of base station-initiated frames is longer than the duration of each of the plurality of device-initiated frames. In some aspects, the duration of each of the plurality of base station-initiated frames is a multiple of the duration of each of the plurality of device-initiated frames.

At 535, UE 115-e may perform an LBT procedure over the channel prior to a starting time of a first device-initiated frame of the plurality of device-initiated frames for an uplink transmission. In some cases, the LBT procedure may be a one-shot LBT procedure that spans one or more symbols prior to the first device-initiated frame.

At 540, UE 115-e may transmit the uplink transmission to the base station 105-c within the first device-initiated frame based at least in part on the LBT procedure. In some aspects, the uplink transmission includes an SR, a PRACH, a periodic CSI report, a semi-persistent CSI report, a PUCCH, a PUSCH, or an AUL transmission.

Figure 6:
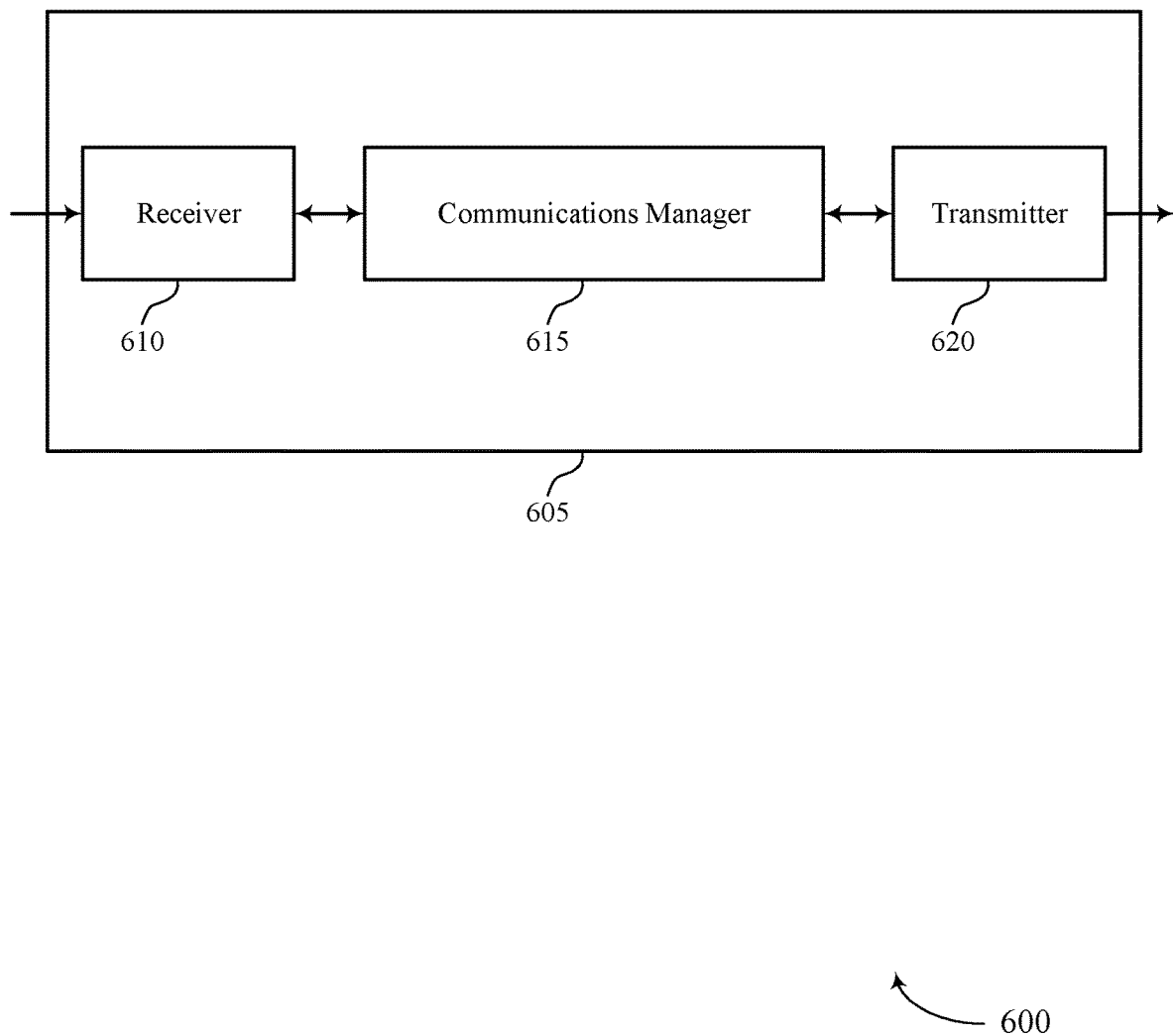
FIGS. 6 and 7 show block diagrams of devices that support frame-based initiator device operation in accordance with aspects of the present disclosure.

FIG. 6 shows a block diagram 600 of a device 605 that supports frame-based initiator device operation in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to frame-based initiator device operation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a base station frame timing for communication initiated by a base station over a channel, the base station frame timing defining a duration of each of a set of base station-initiated frames, a starting time of the set of base station-initiated frames, or a combination thereof. The communications manager 615 may determine a device frame timing for communicating as an initiator device over the channel, the device frame timing defining a duration of each of a set of device-initiated frames, an offset of the set of device-initiated frames relative to the set of base station-initiated frames, or a combination thereof. The communications manager 615 may perform an LBT procedure over the channel prior to a starting time of a first device-initiated frame of the set of device-initiated frames for an uplink transmission and transmit the uplink transmission to the base station within the first device-initiated frame based on the LBT procedure. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some aspects, the communications manager 615, or its sub-components, may be a separate and distinct component in accordance with various aspects of the present disclosure. In some aspects, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some aspects, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
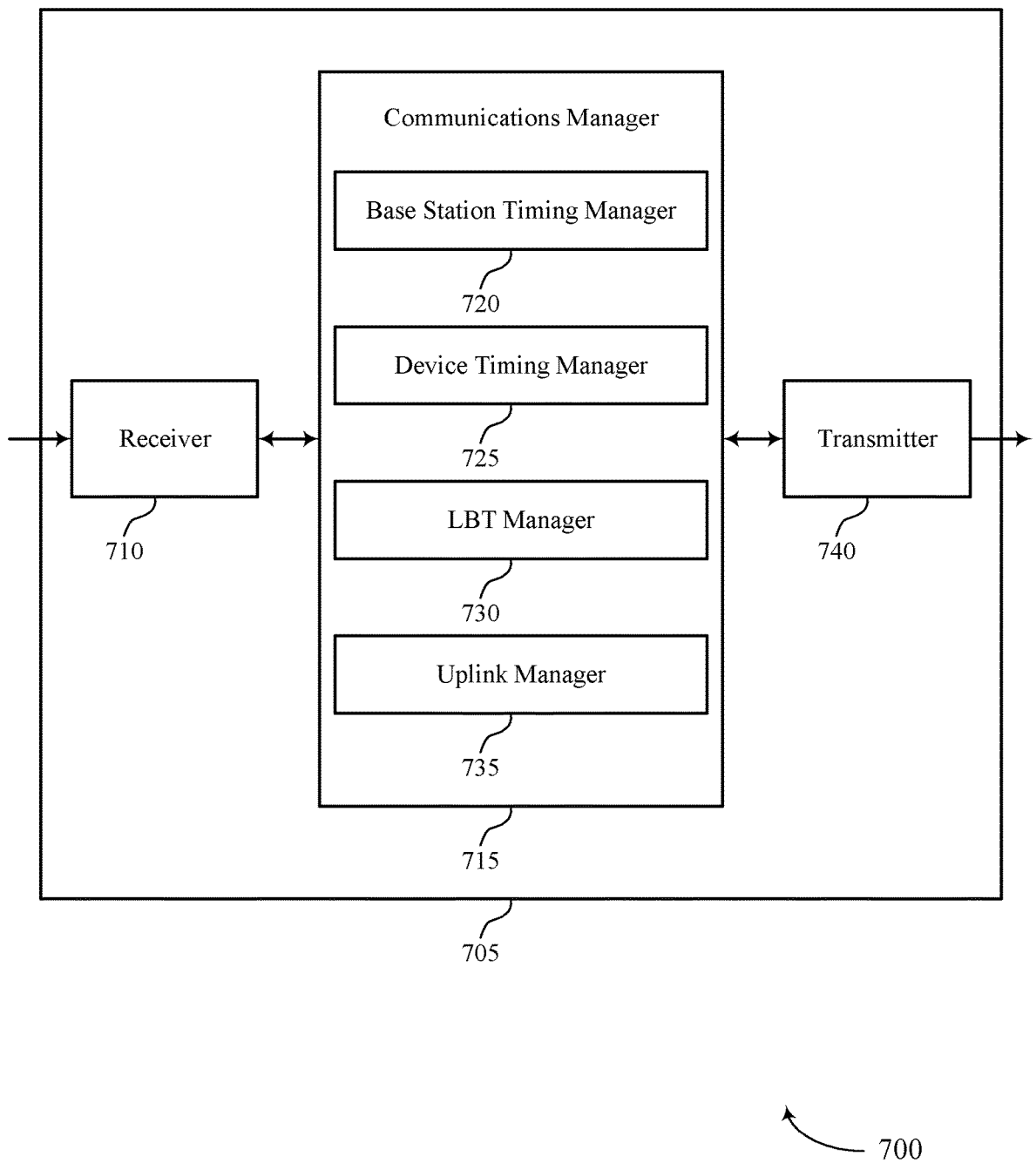

FIG. 7 shows a block diagram 700 of a device 705 that supports frame-based initiator device operation in accordance with aspects of the present disclosure. The device 705 may be an example of aspects of a device 605 or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to frame-based initiator device operation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a base station timing manager 720, a device timing manager 725, an LBT manager 730, and an uplink manager 735. The communications manager 715 may be an example of aspects of the communications manager 910 described herein.

The base station timing manager 720 may determine a base station frame timing for communication initiated by a base station over a channel, the base station frame timing defining a duration of each of a set of base station-initiated frames, a starting time of the set of base station-initiated frames, or a combination thereof.

The device timing manager 725 may determine a device frame timing for communicating as an initiator device over the channel, the device frame timing defining a duration of each of a set of device-initiated frames, an offset of the set of device-initiated frames relative to the set of base station-initiated frames, or a combination thereof.

The LBT manager 730 may perform an LBT procedure over the channel prior to a starting time of a first device-initiated frame of the set of device-initiated frames for an uplink transmission.

The uplink manager 735 may transmit the uplink transmission to the base station within the first device-initiated frame based on the LBT procedure.

The transmitter 740 may transmit signals generated by other components of the device 705. In some aspects, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
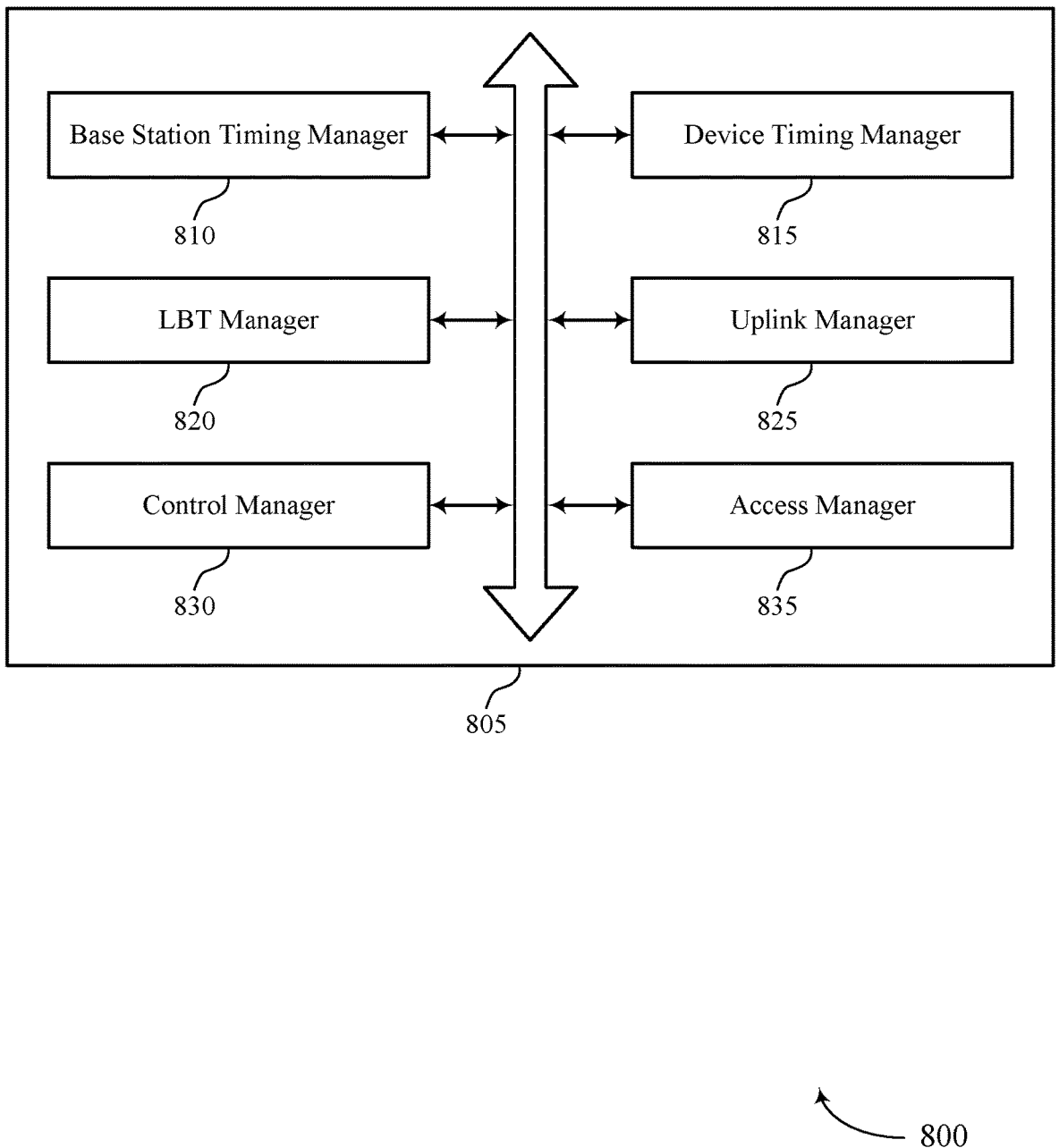
FIG. 8 shows a block diagram of a device that supports frame-based initiator device operation in accordance with aspects of the present disclosure.

FIG. 8 shows a block diagram 800 of a communications manager 805 that supports frame-based initiator device operation in accordance with aspects of the present disclosure. The communications manager 805 may be an example of aspects of a communications manager 615, a communications manager 715, or a communications manager 910 described herein. The communications manager 805 may include a base station timing manager 810, a device timing manager 815, an LBT manager 820, an uplink manager 825, a control manager 830, and an access manager 835. Each of these modules may communicate, directly or indirectly, with one another (e.g., via one or more buses).

The base station timing manager 810 may determine a base station frame timing for communication initiated by a base station over a channel, the base station frame timing defining a duration of each of a set of base station-initiated frames, a starting time of the set of base station-initiated frames, or a combination thereof.

In some cases, the channel is located in a shared radio frequency spectrum band. In some cases, the set of base station-initiated frames include respective idle periods.

The device timing manager 815 may determine a device frame timing for communicating as an initiator device over the channel, the device frame timing defining a duration of each of a set of device-initiated frames, an offset of the set of device-initiated frames relative to the set of base station-initiated frames, or a combination thereof.

In some cases, the duration of each of the set of base station-initiated frames is longer than the duration of each of the set of device-initiated frames. In some cases, the duration of each of the set of base station-initiated frames is a multiple of the duration of each of the set of device-initiated frames.

The LBT manager 820 may perform an LBT procedure over the channel prior to a starting time of a first device-initiated frame of the set of device-initiated frames for an uplink transmission.

The uplink manager 825 may transmit the uplink transmission to the base station within the first device-initiated frame based on the LBT procedure.

In some aspects, the uplink manager 825 may refrain from transmitting during the second device-initiated frame. In some aspects, the uplink manager 825 may receive, from the base station, a configuration for operation over a subset of frequency resources of the channel, where the LBT procedure and the uplink transmission are over the subset of frequency resources.

In some cases, the uplink transmission at least partially overlaps in time with one of the respective idle periods. In some cases, the uplink transmission includes a SR, a PRACH, a periodic CSI report, a semi-persistent CSI report, a PUCCH, a PUSCH, or an AUL transmission.

The control manager 830 may receive, from the base station, a control transmission over the channel within a first base station-initiated frame, the control transmission indicating an availability of the first device-initiated frame within the first base station-initiated frame.

In some aspects, the control manager 830 may receive, from the base station, a control transmission over the channel within a first base station-initiated frame, the control transmission including a grant for transmitting a base station-initiated uplink transmission or receiving a downlink transmission from the base station over a set of scheduled resources within the first base station-initiated frame.

The access manager 835 may enter an idle mode of operation after transmitting the uplink transmission. In some aspects, the access manager 835 may identify data to be transmitted in a second uplink transmission. In some aspects, the access manager 835 may identify PRACH resources in the channel based on an access of the channel by the base station during a first base station-initiated frame. In some aspects, the access manager 835 may transmit a PRACH to the base station based on the PRACH resources and the device frame timing.

Figure 9:
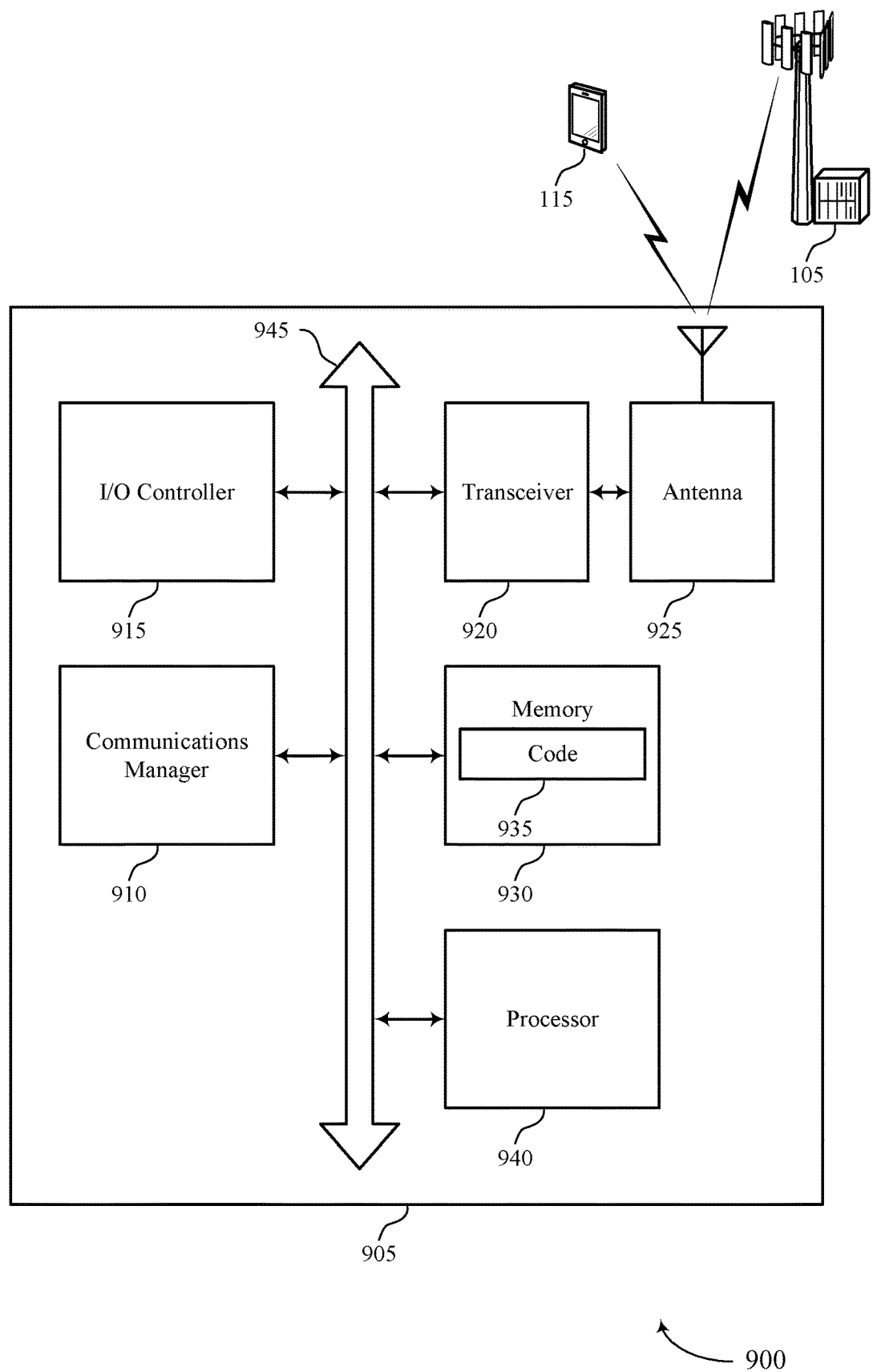
FIG. 9 shows a diagram of a system including a device that supports frame-based initiator device operation in accordance with aspects of the present disclosure.

FIG. 9 shows a diagram of a system 900 including a device 905 that supports frame-based initiator device operation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be coupled via one or more buses (e.g., bus 945).

The communications manager 910 may determine a base station frame timing for communication initiated by a base station over a channel, the base station frame timing defining a duration of each of a set of base station-initiated frames, a starting time of the set of base station-initiated frames, or a combination thereof. The communications manager 910 may determine a device frame timing for communicating as an initiator device over the channel, the device frame timing defining a duration of each of a set of device-initiated frames, an offset of the set of device-initiated frames relative to the set of base station-initiated frames, or a combination thereof. The communications manager 910 may perform an LBT procedure over the channel prior to a starting time of a first device-initiated frame of the set of device-initiated frames for an uplink transmission, and transmit the uplink transmission to the base station within the first device-initiated frame based on the LBT procedure.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting frame-based initiator device operation).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
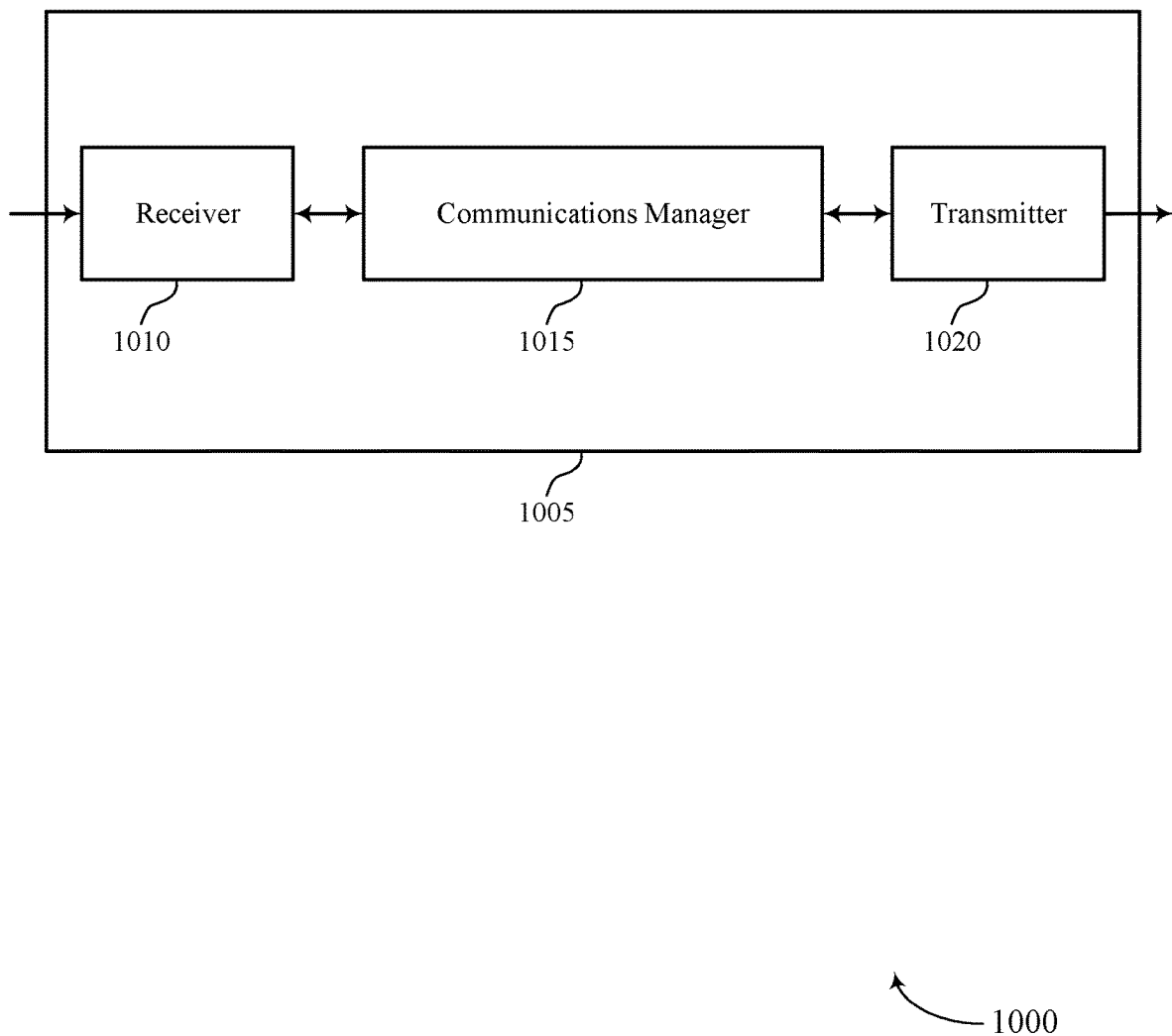
FIGS. 10 and 11 show block diagrams of devices that support frame-based initiator device operation in accordance with aspects of the present disclosure.

FIG. 10 shows a block diagram 1000 of a device 1005 that supports frame-based initiator device operation in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to frame-based initiator device operation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine a base station frame timing for communicating with a set of devices over a channel, the base station frame timing defining a duration of each of a set of base station-initiated frames, a starting time of the set of base station-initiated frames, or a combination thereof. The communications manager 1015 may configure the set of devices with respective device frame timings for operation as initiator devices over the channel, each device frame timing defining a duration of each of a set of device-initiated frames, an offset of the set of device-initiated frames relative to the set of base station-initiated frames, or a combination thereof. The communications manager 1015 may communicate with at least one of the set of devices based on the respective device frame timings. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some aspects, the communications manager 1015, or its sub-components, may be a separate and distinct component in accordance with various aspects of the present disclosure. In some aspects, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some aspects, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
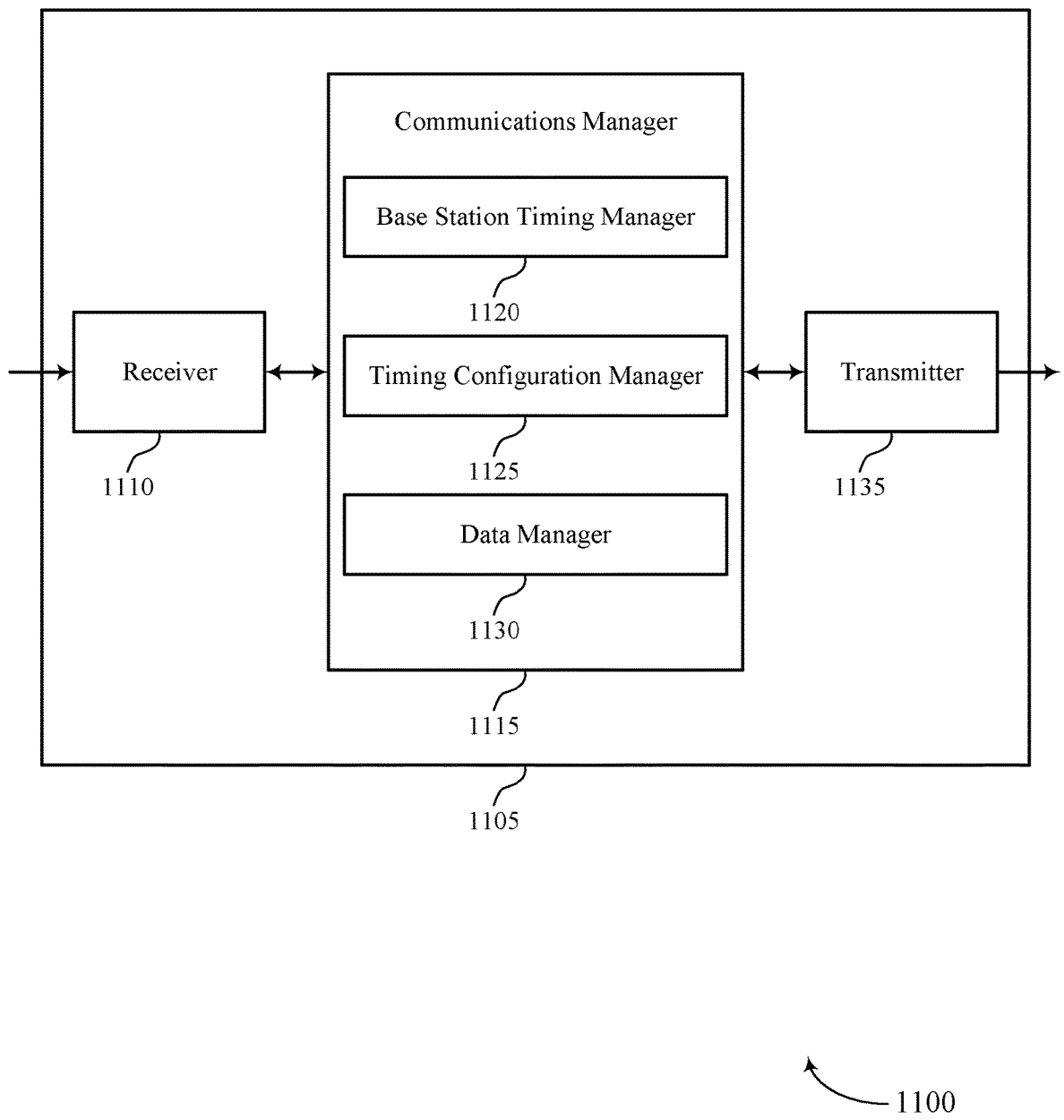

FIG. 11 shows a block diagram 1100 of a device 1105 that supports frame-based initiator device operation in accordance with aspects of the present disclosure. The device 1105 may be an example of aspects of a device 1005 or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to frame-based initiator device operation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a base station timing manager 1120, a timing configuration manager 1125, and a data manager 1130. The communications manager 1115 may be an example of aspects of the communications manager 1310 described herein.

The base station timing manager 1120 may determine a base station frame timing for communicating with a set of devices over a channel, the base station frame timing defining a duration of each of a set of base station-initiated frames, a starting time of the set of base station-initiated frames, or a combination thereof.

The timing configuration manager 1125 may configure the set of devices with respective device frame timings for operation as initiator devices over the channel, each device frame timing defining a duration of each of a set of device-initiated frames, an offset of the set of device-initiated frames relative to the set of base station-initiated frames, or a combination thereof.

The data manager 1130 may communicate with at least one of the set of devices based on the respective device frame timings.

The transmitter 1135 may transmit signals generated by other components of the device 1105. In some aspects, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
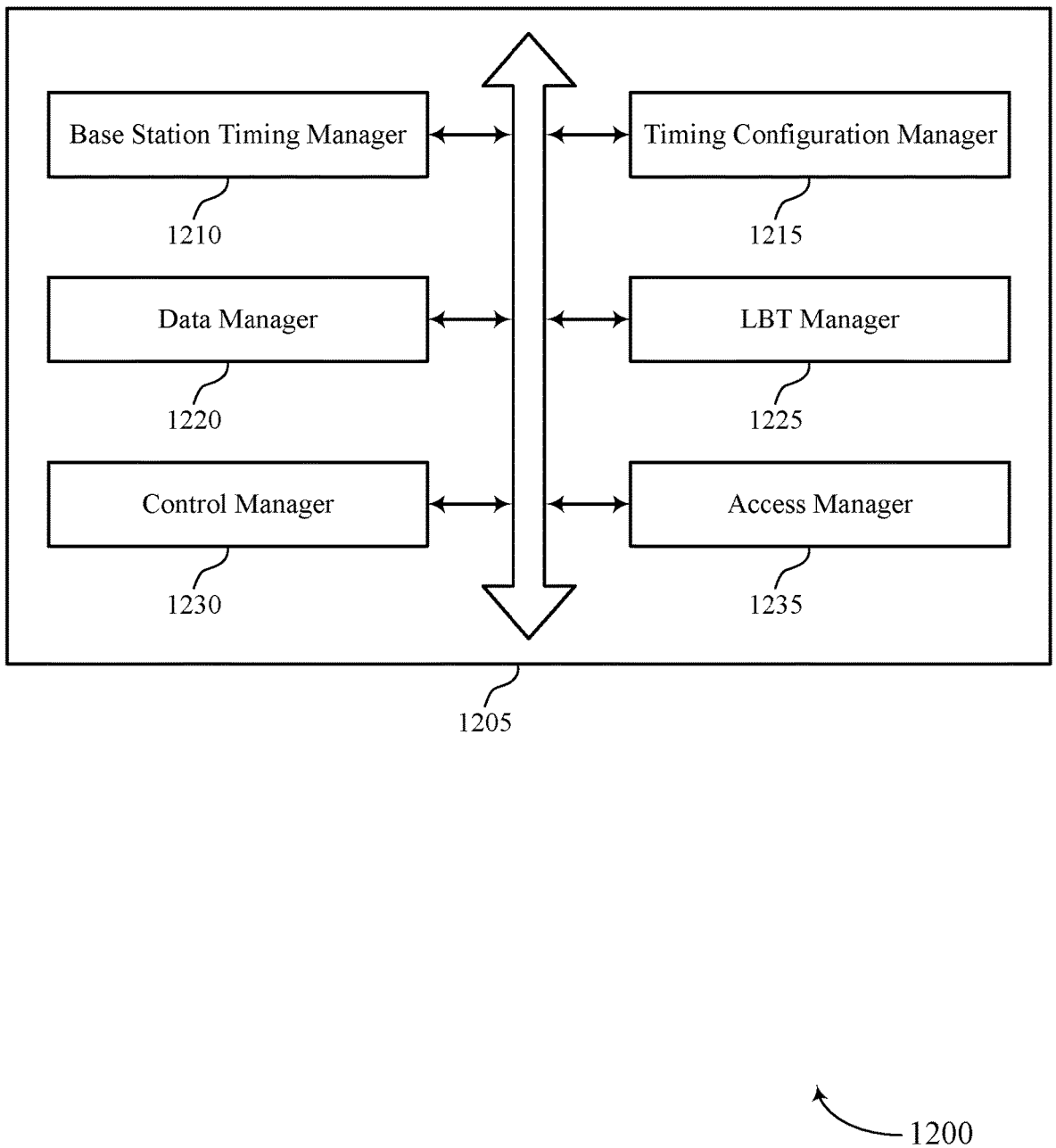
FIG. 12 shows a block diagram of a device that supports frame-based initiator device operation in accordance with aspects of the present disclosure.

FIG. 12 shows a block diagram 1200 of a communications manager 1205 that supports frame-based initiator device operation in accordance with aspects of the present disclosure. The communications manager 1205 may be an example of aspects of a communications manager 1015, a communications manager 1115, or a communications manager 1310 described herein. The communications manager 1205 may include a base station timing manager 1210, a timing configuration manager 1215, a data manager 1220, an LBT manager 1225, a control manager 1230, and an access manager 1235. Each of these modules may communicate, directly or indirectly, with one another (e.g., via one or more buses).

The base station timing manager 1210 may determine a base station frame timing for communicating with a set of devices over a channel, the base station frame timing defining a duration of each of a set of base station-initiated frames, a starting time of the set of base station-initiated frames, or a combination thereof.

In some cases, the channel is located in a shared radio frequency spectrum band. In some aspects, each of the set of base station-initiated frames includes a respective idle period.

The timing configuration manager 1215 may configure the set of devices with respective device frame timings for operation as initiator devices over the channel, each device frame timing defining a duration of each of a set of device-initiated frames, an offset of the set of device-initiated frames relative to the set of base station-initiated frames, or a combination thereof.

In some aspects, the timing configuration manager 1215 may configure the idle device with a device frame timing for operation as an initiator device over the channel. In some cases, the duration of each of the set of base station-initiated frames is longer than the duration of each of the set of device-initiated frames. In some cases, the duration of each of the set of base station-initiated frames is a multiple of the duration of the set of device-initiated frames.

The data manager 1220 may communicate with at least one of the set of devices based on the respective device frame timings.

In some aspects, the data manager 1220 may communicate, as an initiator device, with at least one of the set of devices within the first base station-initiated frame based on the LBT procedure.

In some aspects, the data manager 1220 may transmit, to at least one of the set of devices, a configuration to operate over a subset of frequency resources of the channel.

In some aspects, communicating with at least one of the set of devices includes receiving an SR, a PRACH, a periodic CSI reporting, a semi-persistent CSI reporting, a PUCCH, a PUSCH, or an AUL transmission. In some cases, the communicating includes receiving an uplink transmission over a set of resources that at least partially overlaps in time with an idle period of a first base station-initiated frame of the set of base station-initiated frames.

The LBT manager 1225 may perform an LBT procedure over the channel prior to a first base station-initiated frame of the set of base station-initiated frames.

The control manager 1230 may transmit a control transmission over the channel within the first base station-initiated frame, the control transmission indicating an availability of the plurality of device-initiated frames within the first base station-initiated frame.

In some aspects, transmitting a control transmission over the channel within the first base station-initiated frame, where the control transmission includes a grant of a set of scheduled resources for at least one of the set of devices for an uplink transmission or a downlink transmission.

The access manager 1235 may configure PRACH resources in the channel based on the LBT procedure. In some aspects, the access manager 1235 may receive a PRACH from an idle device over the PRACH resources.

Figure 13:
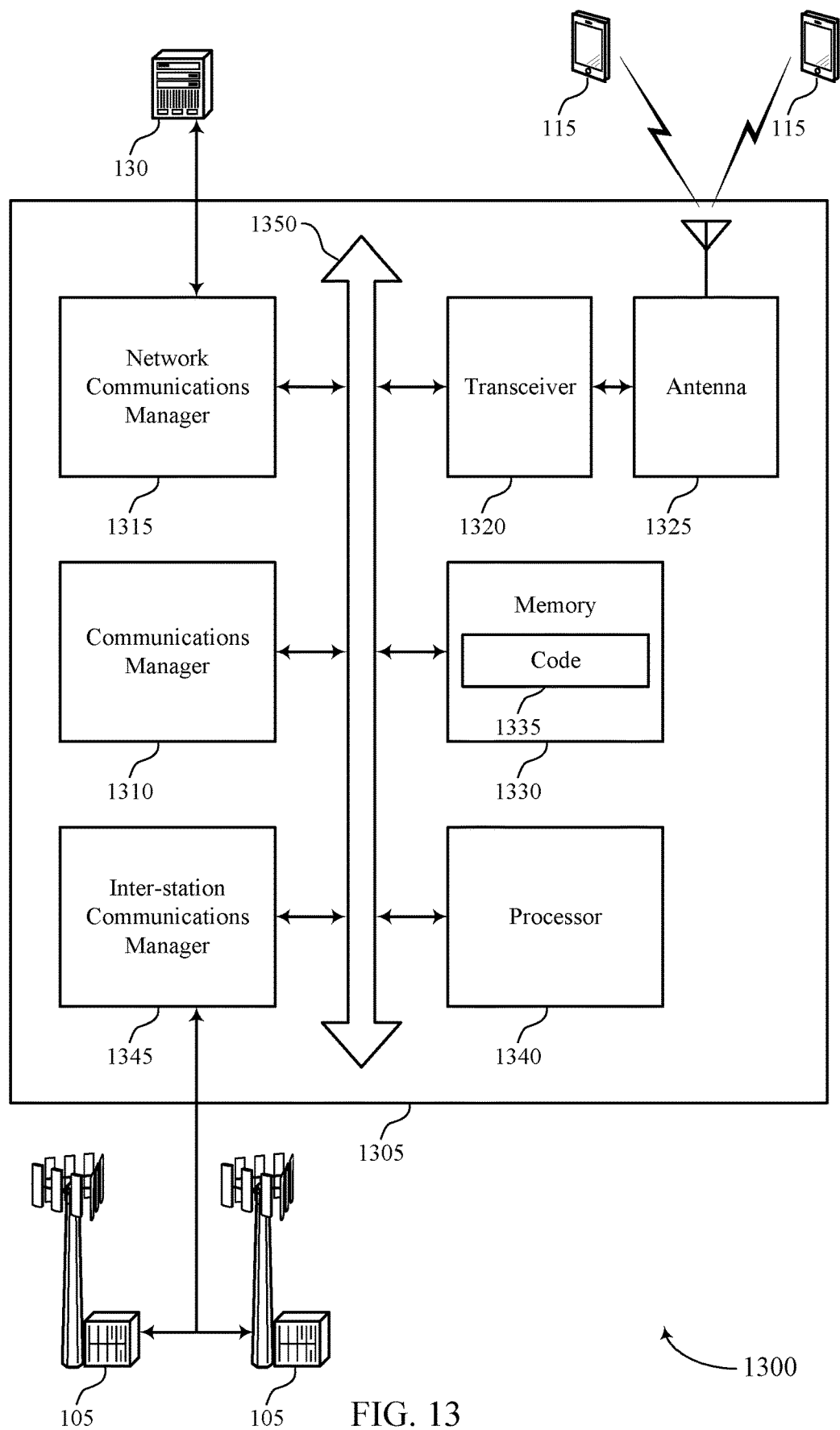
FIG. 13 shows a diagram of a system including a device that supports frame-based initiator device operation in accordance with aspects of the present disclosure.

FIG. 13 shows a diagram of a system 1300 including a device 1305 that supports frame-based initiator device operation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be coupled via one or more buses (e.g., bus 1350).

The communications manager 1310 may determine a base station frame timing for communicating with a set of devices over a channel, the base station frame timing defining a duration of each of a set of base station-initiated frames, a starting time of the set of base station-initiated frames, or a combination thereof. The communications manager 1310 may configure the set of devices with respective device frame timings for operation as initiator devices over the channel, each device frame timing defining a duration of each of a set of device-initiated frames, an offset of the set of device-initiated frames relative to the set of base station-initiated frames, or a combination thereof. The communications manager 1310 may communicate with at least one of the set of devices based on the respective device frame timings.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device #{device} to perform various functions (e.g., functions or tasks supporting frame-based initiator device operation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some aspects, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
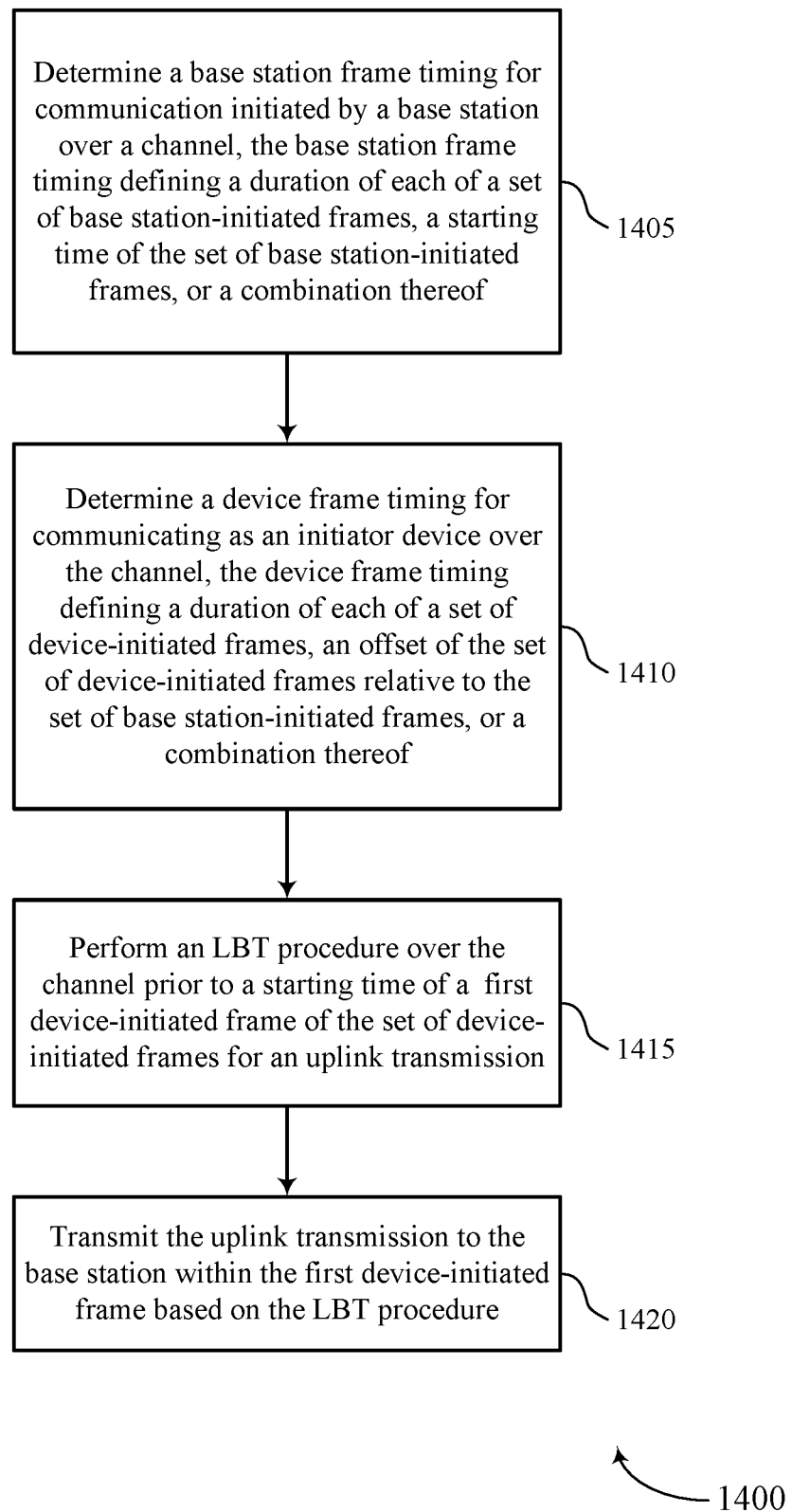
FIGS. 14 through 18 show flowcharts illustrating methods that support frame-based initiator device operation in accordance with aspects of the present disclosure.

FIG. 14 shows a flowchart illustrating a method 1400 that supports frame-based initiator device operation in accordance with aspects of the present disclosure. The operations of method 1400 may be implemented by a UE 115 or its components as described herein. For example, the operations of method 1400 may be performed by a communications manager as described with reference to FIGS. 6 to 9. In some aspects, a UE may execute a set of instructions to control the functional elements of the UE to perform the functions described herein. Additionally, or alternatively, a UE may perform aspects of the functions described herein using special-purpose hardware.

At 1405, the UE may determine a base station frame timing for communication initiated by a base station over a channel, the base station frame timing defining a duration of each of a set of base station-initiated frames, a starting time of the set of base station-initiated frames, or a combination thereof. The operations of 1405 may be performed according to the methods described herein. In some aspects, aspects of the operations of 1405 may be performed by a base station timing manager as described with reference to FIGS. 6 to 9.

At 1410, the UE may determine a device frame timing for communicating as an initiator device over the channel, the device frame timing defining a duration of each of a set of device-initiated frames, an offset of the set of device-initiated frames relative to the set of base station-initiated frames, or a combination thereof. The operations of 1410 may be performed according to the methods described herein. In some aspects, aspects of the operations of 1410 may be performed by a device timing manager as described with reference to FIGS. 6 to 9.

At 1415, the UE may perform an LBT procedure over the channel prior to a starting time of a first device-initiated frame of the set of device-initiated frames for an uplink transmission. The operations of 1415 may be performed according to the methods described herein. In some aspects, aspects of the operations of 1415 may be performed by an LBT manager as described with reference to FIGS. 6 to 9.

At 1420, the UE may transmit the uplink transmission to the base station within the first device-initiated frame based on the LBT procedure. The operations of 1420 may be performed according to the methods described herein. In some aspects, aspects of the operations of 1420 may be performed by an uplink manager as described with reference to FIGS. 6 to 9.

Figure 15:
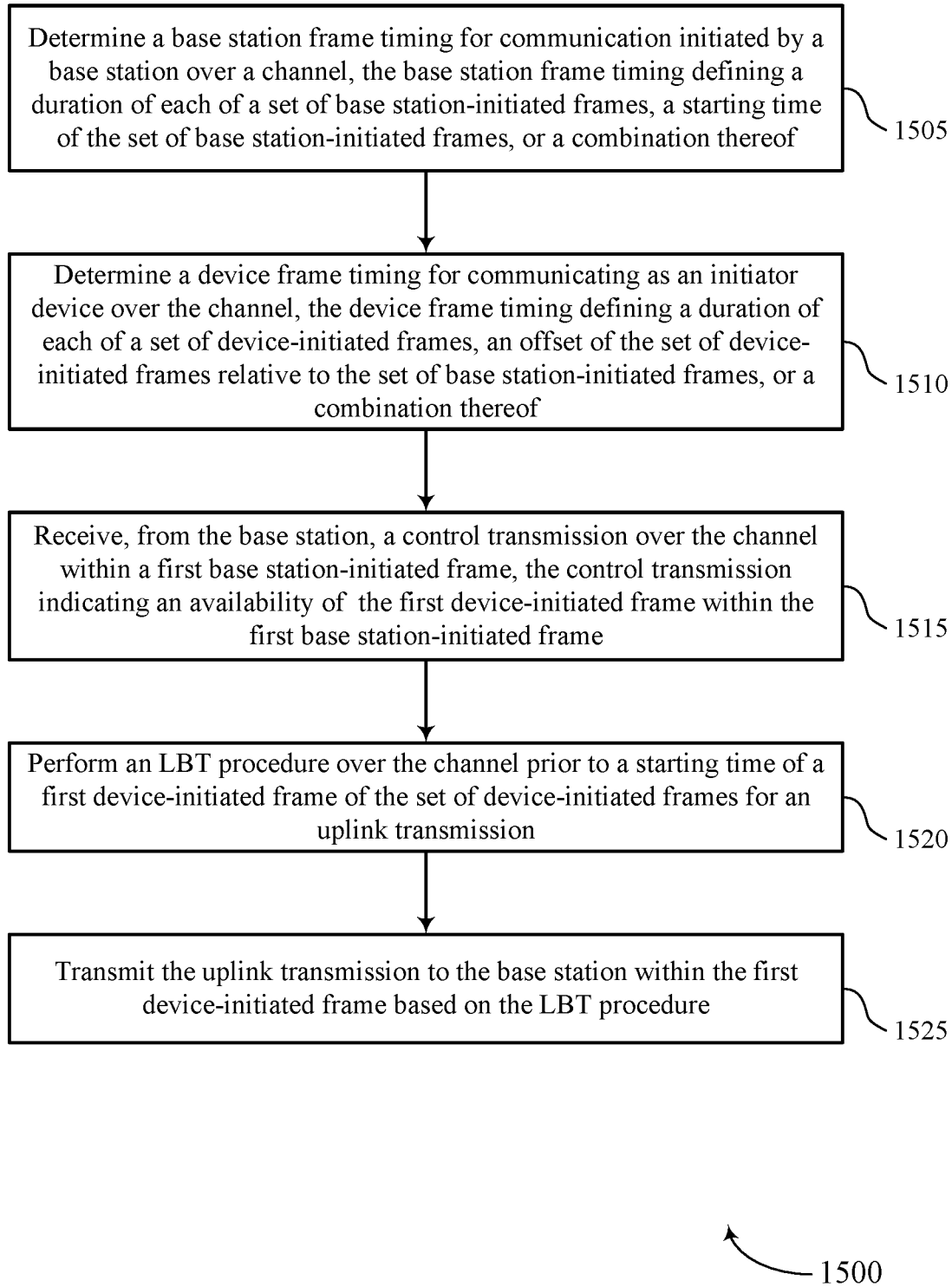

FIG. 15 shows a flowchart illustrating a method 1500 that supports frame-based initiator device operation in accordance with aspects of the present disclosure. The operations of method 1500 may be implemented by a UE 115 or its components as described herein. For example, the operations of method 1500 may be performed by a communications manager as described with reference to FIGS. 6 to 9. In some aspects, a UE may execute a set of instructions to control the functional elements of the UE to perform the functions described herein. Additionally, or alternatively, a UE may perform aspects of the functions described herein using special-purpose hardware.

At 1505, the UE may determine a base station frame timing for communication initiated by a base station over a channel, the base station frame timing defining a duration of each of a set of base station-initiated frames, a starting time of the set of base station-initiated frames, or a combination thereof. The operations of 1505 may be performed according to the methods described herein. In some aspects, aspects of the operations of 1505 may be performed by a base station timing manager as described with reference to FIGS. 6 to 9.

At 1510, the UE may determine a device frame timing for communicating as an initiator device over the channel, the device frame timing defining a duration of each of a set of device-initiated frames, an offset of the set of device-initiated frames relative to the set of base station-initiated frames, or a combination thereof. The operations of 1510 may be performed according to the methods described herein. In some aspects, aspects of the operations of 1510 may be performed by a device timing manager as described with reference to FIGS. 6 to 9.

At 1515, the UE may receive, from the base station, a control transmission over the channel within a first base station-initiated frame, the control transmission indicating an availability of the first device-initiated frame within the first base station-initiated frame. The operations of 1515 may be performed according to the methods described herein. In some aspects, aspects of the operations of 1515 may be performed by a control manager as described with reference to FIGS. 6 to 9.

At 1520, the UE may perform an LBT procedure over the channel prior to a starting time of a first device-initiated frame of the set of device-initiated frames for an uplink transmission. The operations of 1520 may be performed according to the methods described herein. In some aspects, aspects of the operations of 1520 may be performed by an LBT manager as described with reference to FIGS. 6 to 9.

At 1525, the UE may transmit the uplink transmission to the base station within the first device-initiated frame based on the LBT procedure. The operations of 1525 may be performed according to the methods described herein. In some aspects, aspects of the operations of 1525 may be performed by an uplink manager as described with reference to FIGS. 6 to 9.

Figure 16:
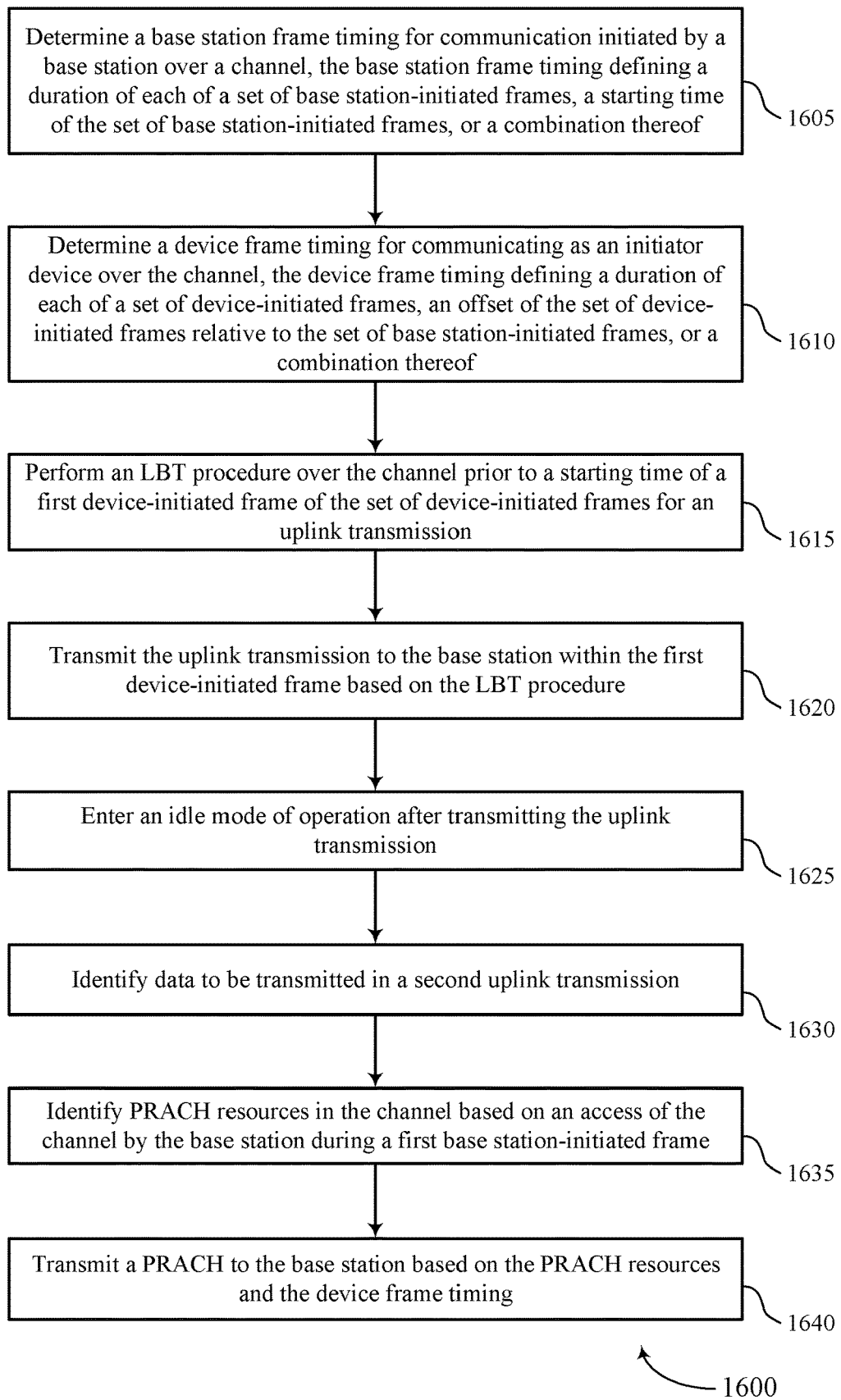

FIG. 16 shows a flowchart illustrating a method 1600 that supports frame-based initiator device operation in accordance with aspects of the present disclosure. The operations of method 1600 may be implemented by a UE 115 or its components as described herein. For example, the operations of method 1600 may be performed by a communications manager as described with reference to FIGS. 6 to 9. In some aspects, a UE may execute a set of instructions to control the functional elements of the UE to perform the functions described herein. Additionally, or alternatively, a UE may perform aspects of the functions described herein using special-purpose hardware.

At 1605, the UE may determine a base station frame timing for communication initiated by a base station over a channel, the base station frame timing defining a duration of each of a set of base station-initiated frames, a starting time of the set of base station-initiated frames, or a combination thereof. The operations of 1605 may be performed according to the methods described herein. In some aspects, aspects of the operations of 1605 may be performed by a base station timing manager as described with reference to FIGS. 6 to 9.

At 1610, the UE may determine a device frame timing for communicating as an initiator device over the channel, the device frame timing defining a duration of each of a set of device-initiated frames, an offset of the set of device-initiated frames relative to the set of base station-initiated frames, or a combination thereof. The operations of 1610 may be performed according to the methods described herein. In some aspects, aspects of the operations of 1610 may be performed by a device timing manager as described with reference to FIGS. 6 to 9.

At 1615, the UE may perform an LBT procedure over the channel prior to a starting time of a first device-initiated frame of the set of device-initiated frames for an uplink transmission. The operations of 1615 may be performed according to the methods described herein. In some aspects, aspects of the operations of 1615 may be performed by an LBT manager as described with reference to FIGS. 6 to 9.

At 1620, the UE may transmit the uplink transmission to the base station within the first device-initiated frame based on the LBT procedure. The operations of 1620 may be performed according to the methods described herein. In some aspects, aspects of the operations of 1620 may be performed by an uplink manager as described with reference to FIGS. 6 to 9.

At 1625, the UE may enter an idle mode of operation after transmitting the uplink transmission. The operations of 1625 may be performed according to the methods described herein. In some aspects, aspects of the operations of 1625 may be performed by an access manager as described with reference to FIGS. 6 to 9.

At 1630, the UE may identify data to be transmitted in a second uplink transmission. The operations of 1630 may be performed according to the methods described herein. In some aspects, aspects of the operations of 1630 may be performed by an access manager as described with reference to FIGS. 6 to 9.

At 1635, the UE may identify PRACH resources in the channel based on an access of the channel by the base station during a first base station-initiated frame. The operations of 1635 may be performed according to the methods described herein. In some aspects, aspects of the operations of 1635 may be performed by an access manager as described with reference to FIGS. 6 to 9.

At 1640, the UE may transmit a PRACH to the base station based on the PRACH resources and the device frame timing. The operations of 1640 may be performed according to the methods described herein. In some aspects, aspects of the operations of 1640 may be performed by an access manager as described with reference to FIGS. 6 to 9.

Figure 17:
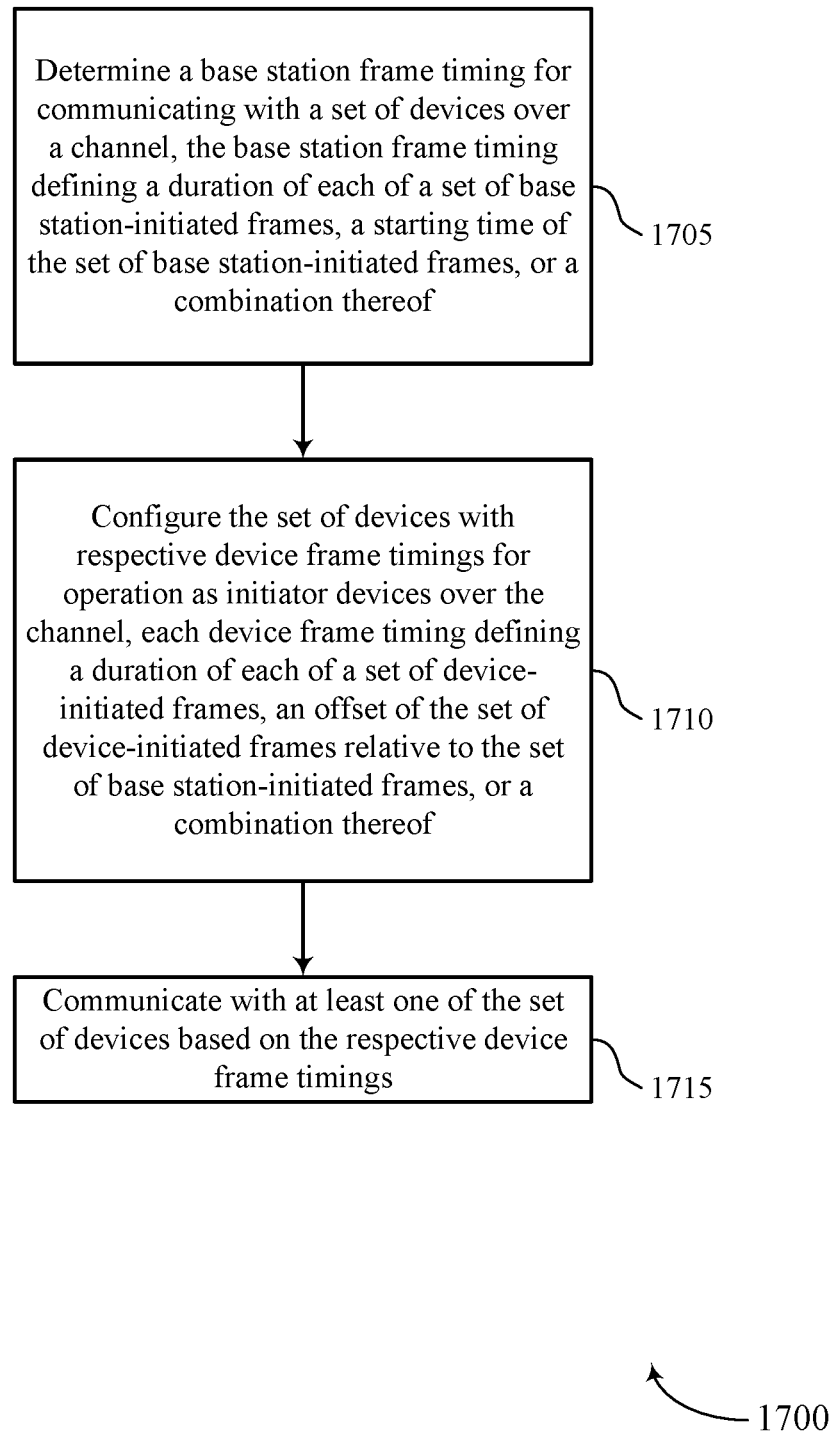

FIG. 17 shows a flowchart illustrating a method 1700 that supports frame-based initiator device operation in accordance with aspects of the present disclosure. The operations of method 1700 may be implemented by a base station 105 or its components as described herein. For example, the operations of method 1700 may be performed by a communications manager as described with reference to FIGS. 10 to 13. In some aspects, a base station may execute a set of instructions to control the functional elements of the base station to perform the functions described herein. Additionally, or alternatively, a base station may perform aspects of the functions described herein using special-purpose hardware.

At 1705, the base station may determine a base station frame timing for communicating with a set of devices over a channel, the base station frame timing defining a duration of each of a set of base station-initiated frames, a starting time of the set of base station-initiated frames, or a combination thereof. The operations of 1705 may be performed according to the methods described herein. In some aspects, aspects of the operations of 1705 may be performed by a base station timing manager as described with reference to FIGS. 10 to 13.

At 1710, the base station may configure the set of devices with respective device frame timings for operation as initiator devices over the channel, each device frame timing defining a duration of each of a set of device-initiated frames, an offset of the set of device-initiated frames relative to the set of base station-initiated frames, or a combination thereof. The operations of 1710 may be performed according to the methods described herein. In some aspects, aspects of the operations of 1710 may be performed by a timing configuration manager as described with reference to FIGS. 10 to 13.

At 1715, the base station may communicate with at least one of the set of devices based on the respective device frame timings. The operations of 1715 may be performed according to the methods described herein. In some aspects, aspects of the operations of 1715 may be performed by a data manager as described with reference to FIGS. 10 to 13.

Figure 18:
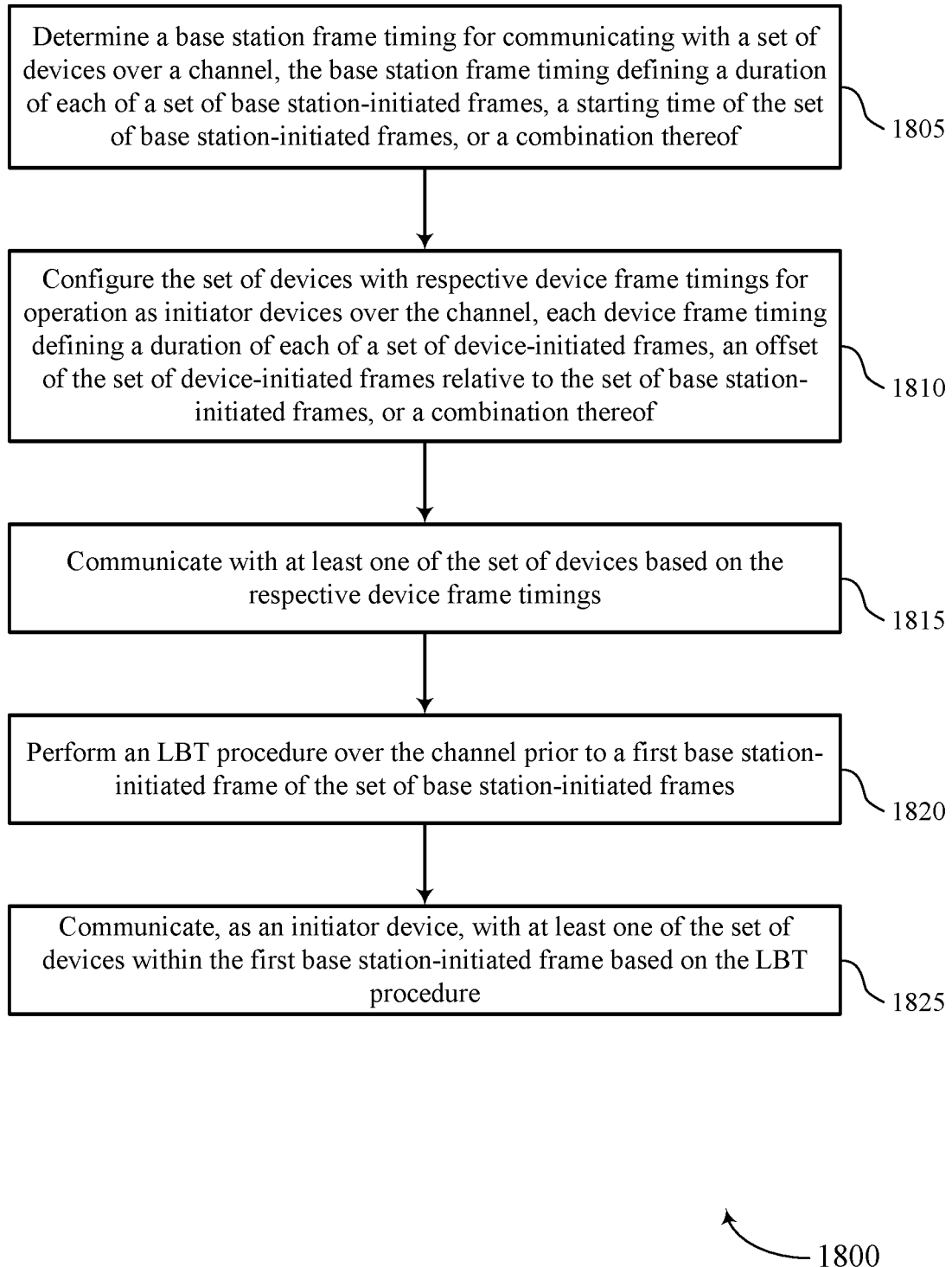

FIG. 18 shows a flowchart illustrating a method 1800 that supports frame-based initiator device operation in accordance with aspects of the present disclosure. The operations of method 1800 may be implemented by a base station 105 or its components as described herein. For example, the operations of method 1800 may be performed by a communications manager as described with reference to FIGS. 10 to 13. In some aspects, a base station may execute a set of instructions to control the functional elements of the base station to perform the functions described herein. Additionally, or alternatively, a base station may perform aspects of the functions described herein using special-purpose hardware.

At 1805, the base station may determine a base station frame timing for communicating with a set of devices over a channel, the base station frame timing defining a duration of each of a set of base station-initiated frames, a starting time of the set of base station-initiated frames, or a combination thereof. The operations of 1805 may be performed according to the methods described herein. In some aspects, aspects of the operations of 1805 may be performed by a base station timing manager as described with reference to FIGS. 10 to 13.

At 1810, the base station may configure the set of devices with respective device frame timings for operation as initiator devices over the channel, each device frame timing defining a duration of each of a set of device-initiated frames, an offset of the set of device-initiated frames relative to the set of base station-initiated frames, or a combination thereof. The operations of 1810 may be performed according to the methods described herein. In some aspects, aspects of the operations of 1810 may be performed by a timing configuration manager as described with reference to FIGS. 10 to 13.

At 1815, the base station may communicate with at least one of the set of devices based on the respective device frame timings. The operations of 1815 may be performed according to the methods described herein. In some aspects, aspects of the operations of 1815 may be performed by a data manager as described with reference to FIGS. 10 to 13.

At 1820, the base station may perform an LBT procedure over the channel prior to a first base station-initiated frame of the set of base station-initiated frames. The operations of 1820 may be performed according to the methods described herein. In some aspects, aspects of the operations of 1820 may be performed by an LBT manager as described with reference to FIGS. 10 to 13.

At 1825, the base station may communicate, as an initiator device, with at least one of the set of devices within the first base station-initiated frame based on the LBT procedure. The operations of 1825 may be performed according to the methods described herein. In some aspects, aspects of the operations of 1825 may be performed by a data manager as described with reference to FIGS. 10 to 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    determining a network device frame timing for communication initiated by a network device over a channel, the network device frame timing defining a duration of each of a plurality of network device-initiated frames, a starting time of the plurality of network device-initiated frames, or a combination thereof;
    determining a device frame timing for communicating as an initiator device over the channel, the device frame timing defining a duration of each of a plurality of device-initiated frames, an offset of the plurality of device-initiated frames relative to the plurality of network device-initiated frames, or a combination thereof;
    receiving, from the network device, a control transmission over the channel within a first network device-initiated frame, the control transmission indicating an availability of a first device-initiated frame of the plurality of device-initiated frames;
    performing, based at least in part on the availability, a listen-before-talk (LBT) procedure over the channel prior to a starting time of the first device-initiated frame for an uplink transmission; and
    transmitting the uplink transmission to the network device within the first device-initiated frame based at least in part on the LBT procedure.

2. The method of claim 1, further comprising:
    receiving, from the network device, a second control transmission over the channel within the first network device-initiated frame, the second control transmission comprising a grant for transmitting a network device-initiated uplink transmission or receiving a downlink transmission from the network device over a set of scheduled resources within the first network device-initiated frame.

3. The method of claim 2, wherein the set of scheduled resources overlaps at least partially with an idle period preceding a second device-initiated frame of the plurality of device-initiated frames, the method further comprising:
    refraining from transmitting during the second device-initiated frame.

4. The method of claim 1, further comprising:
    entering an idle mode of operation after transmitting the uplink transmission;
    identifying data to be transmitted in a second uplink transmission;
    identifying physical random access channel (PRACH) resources in the channel based at least in part on an access of the channel by the network device during the first network device-initiated frame; and
    transmitting a PRACH to the network device based at least in part on the PRACH resources and the device frame timing.

5. The method of claim 1, further comprising:
    receiving, from the network device, a configuration for operation over a subset of frequency resources of the channel, wherein the LBT procedure and the uplink transmission are over the subset of frequency resources.

6. The method of claim 1, wherein the channel is located in a shared radio frequency spectrum band.

7. The method of claim 1, wherein the duration of each of the plurality of network device-initiated frames is longer than the duration of each of the plurality of device-initiated frames.

8. The method of claim 1, wherein the duration of each of the plurality of network device-initiated frames is a multiple of the duration of each of the plurality of device-initiated frames.

9. The method of claim 1, wherein the plurality of network device-initiated frames comprise respective idle periods.

10. The method of claim 9, wherein the uplink transmission at least partially overlaps in time with one of the respective idle periods.

11. The method of claim 1, wherein the uplink transmission comprises a scheduling request (SR), a physical random access channel (PRACH), a periodic channel state information (CSI) report, a semi-persistent CSI report, a physical uplink control channel (PUCCH), a physical uplink shared channel (PUSCH), or an autonomous uplink (AUL) transmission.

12. A method for wireless communication, comprising:
determining a network device frame timing for communicating with a plurality of devices over a channel, the network device frame timing defining a duration of each of a plurality of network device-initiated frames, a starting time of the plurality of network device-initiated frames, or a combination thereof;
configuring the plurality of devices with respective device frame timings for operation as initiator devices over the channel, each device frame timing defining a duration of each of a plurality of device-initiated frames, an offset of the plurality of device-initiated frames relative to the plurality of network device-initiated frames, or a combination thereof;
transmitting a control transmission over the channel within a first network device-initiated frame, the control transmission indicating an availability of the plurality of device-initiated frames; and
communicating with at least one of the plurality of devices based at least in part on the respective device frame timings.

13. The method of claim 12, further comprising:
performing a listen-before-talk (LBT) procedure over the channel prior to the first network device-initiated frame of the plurality of network device-initiated frames; and
communicating, as an initiator device, with at least one of the plurality of devices within the first network device-initiated frame based at least in part on the LBT procedure.

14. The method of claim 13, further comprising:
transmitting a second control transmission over the channel within the first network device-initiated frame, wherein the second control transmission comprises a grant of a set of scheduled resources for at least one of the plurality of devices for an uplink transmission or a downlink transmission.

15. The method of claim 13, further comprising:
configuring physical random access channel (PRACH) resources in the channel based at least in part on the LBT procedure;
receiving a PRACH from an idle device over the PRACH resources; and
configuring the idle device with a device frame timing for operation as an initiator device over the channel.

16. The method of claim 12, further comprising:
transmitting, to at least one of the plurality of devices, a configuration to operate over a subset of frequency resources of the channel.

17. The method of claim 12, wherein the channel is located in a shared radio frequency spectrum band.

18. The method of claim 12, wherein the duration of each of the plurality of network device-initiated frames is longer than the duration of each of the plurality of device-initiated frames.

19. The method of claim 12, wherein the duration of each of the plurality of network device-initiated frames is a multiple of the duration of the plurality of device-initiated frames.

20. The method of claim 12, wherein each of the plurality of network device-initiated frames comprises a respective idle period.

21. The method of claim 20, wherein communicating with at least one of the plurality of devices comprises:
receiving an uplink transmission over a set of resources that at least partially overlaps in time with an idle period of the first network device-initiated frame of the plurality of network device-initiated frames.

22. The method of claim 12, wherein communicating with at least one of the plurality of devices comprises:
receiving a scheduling request (SR), a physical random access channel (PRACH), a periodic channel state information (CSI) reporting, a semi-persistent CSI reporting, a physical uplink control channel (PUCCH), a physical uplink shared channel (PUSCH), or an autonomous uplink (AUL) transmission.

23. An apparatus for wireless communication, comprising:
a processor; and
memory coupled with the processor, wherein the memory comprises instructions executable by the processor to cause the apparatus to:
determine a network device frame timing for communication initiated by a network device over a channel, the network device frame timing defining a duration of each of a plurality of network device-initiated frames, a starting time of the plurality of network device-initiated frames, or a combination thereof;
determine a device frame timing for communicating as an initiator device over the channel, the device frame timing defining a duration of each of a plurality of device-initiated frames, an offset of the plurality of device-initiated frames relative to the plurality of network device-initiated frames, or a combination thereof;
receive, from the network device, a control transmission over the channel within a first network device-initiated frame, the control transmission indicating an availability of a first device-initiated frame of the plurality of device-initiated frames;
perform a listen-before-talk (LBT) procedure over the channel prior to a starting time of the first device-initiated frame for an uplink transmission; and
transmit the uplink transmission to the network device within the first device-initiated frame based at least in part on the LBT procedure.

24. The apparatus of claim 23, wherein the instructions are further executable by the processor to cause the apparatus to:
receive, from the network device, a second control transmission over the channel within the first network device-initiated frame, the second control transmission comprising a grant for transmitting a network device-initiated uplink transmission or receiving a downlink transmission from the network device over a set of scheduled resources within the first network device-initiated frame.

25. The apparatus of claim 24, wherein the set of scheduled resources overlaps at least partially with an idle period preceding a second device-initiated frame of the plurality of device-initiated frames, the instructions further executable by the processor to cause the apparatus to:
refrain from transmitting during the second device-initiated frame.

26. The apparatus of claim 23, wherein the instructions are further executable by the processor to cause the apparatus to:
enter an idle mode of operation after transmitting the uplink transmission;

identify data to be transmitted in a second uplink transmission;

identify physical random access channel (PRACH) resources in the channel based at least in part on an access of the channel by the network device during the first network device-initiated frame; and transmit a PRACH to the network device based at least in part on the PRACH resources and the device frame timing.

27. The apparatus of claim 23, wherein the instructions are further executable by the processor to cause the apparatus to:

receive, from the network device, a configuration for operation over a subset of frequency resources of the channel, wherein the LBT procedure and the uplink transmission are over the subset of frequency resources.

28. The apparatus of claim 23, wherein the channel is located in a shared radio frequency spectrum band.

29. An apparatus for wireless communication, comprising:

a processor; and memory coupled with the processor, wherein the memory comprises instructions executable by the processor to cause the apparatus to:

determine a network device frame timing for communicating with a plurality of devices over a channel, the network device frame timing defining a duration of each of a plurality of network device-initiated frames, a starting time of the plurality of network device-initiated frames, or a combination thereof;

configure the plurality of devices with respective device frame timings for operation as initiator devices over the channel, each device frame timing defining a duration of each of a plurality of device-initiated frames, an offset of the plurality of device-initiated frames relative to the plurality of network device-initiated frames, or a combination thereof;

transmit a control transmission over the channel within a first network device-initiated frame, the control transmission indicating an availability of the plurality of device-initiated frames; and communicate with at least one of the plurality of devices based at least in part on the respective device frame timings.

30. The apparatus of claim 29, wherein the instructions are further executable by the processor to cause the apparatus to:

perform a listen-before-talk (LBT) procedure over the channel prior to the first network device-initiated frame of the plurality of network device-initiated frames; and communicate, as an initiator device, with at least one of the plurality of devices within the first network device-initiated frame based at least in part on the LBT procedure.

* * * * *